US011725355B2

(12) United States Patent
Masserant

(10) Patent No.: US 11,725,355 B2
(45) Date of Patent: *Aug. 15, 2023

(54) STRUCTURAL BARRIER AND A METHOD OF INSTALLATION THEREOF

(71) Applicant: Mid-American Gunite, Inc., Newport, MI (US)

(72) Inventor: Keith P. Masserant, Newport, MI (US)

(73) Assignee: Mid-American Gunite, Inc., Newport, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,354

(22) Filed: Nov. 7, 2022

(65) Prior Publication Data

US 2023/0058476 A1 Feb. 23, 2023

Related U.S. Application Data

(63) Continuation of application No. 17/015,703, filed on Sep. 9, 2020, now Pat. No. 11,492,768.

(Continued)

(51) Int. Cl.
*E01F 15/08* (2006.01)
*E01F 13/02* (2006.01)
(Continued)

(52) U.S. Cl.
CPC ............ *E01F 15/083* (2013.01); *C04B 7/147* (2013.01); *C04B 14/48* (2013.01); *C04B 16/0633* (2013.01); *C04B 18/067* (2013.01); *C04B 41/4884* (2013.01); *E01F 13/02* (2013.01); *E01F 13/022* (2013.01); *E01F 15/086* (2013.01); *C04B 2201/52* (2013.01)

(58) Field of Classification Search
CPC ....... E01F 13/02; E01F 13/022; E01F 15/083; E01F 15/086; C04B 7/147; C04B 14/48; C04B 16/0633; C04B 18/067; C04B 41/4884; C04B 2201/52
USPC ........................................................ 404/6, 72
See application file for complete search history.

(56) References Cited

U.S. PATENT DOCUMENTS

RE24,632 E * 4/1959 Danel et al. ............ E02B 3/129
D25/113
2,909,037 A * 10/1959 Palmer .................... E02B 3/129
405/29

(Continued)

*Primary Examiner* — Raymond W Addie
(74) *Attorney, Agent, or Firm* — Quinn IP Law

(57) ABSTRACT

A structural barrier and energy absorbing device comprises a plurality of structural elements. The structural element alone or in a plurality may serve as a traversal impediment or energy absorbing device, such as a pedestrian barrier, vehicular barrier, anti-tank obstacle, ballistic barrier, or the like. The structural element may be a tetrapod such that it comprises an element body having four extension portions that extend outwardly from the interior center to a distal end, such that the structural element maintains an identical orientation and a low center of gravity in each of four resting positions. The structural element may be a solid-state structural element comprised of a particular material or a portable and collapsible structural element wherein the element body comprises an outer skin defining an interior void space, such that during set-up or installation the interior void space may be filled with a filler substance onsite.

20 Claims, 11 Drawing Sheets

Related U.S. Application Data

(60) Provisional application No. 62/898,769, filed on Sep. 11, 2019, provisional application No. 62/898,771, filed on Sep. 11, 2019.

(51) Int. Cl.
*C04B 7/147* (2006.01)
*C04B 14/48* (2006.01)
*C04B 16/06* (2006.01)
*C04B 18/06* (2006.01)
*C04B 41/48* (2006.01)

(56) References Cited

U.S. PATENT DOCUMENTS

| | | | | |
|---|---|---|---|---|
| 3,091,087 | A * | 5/1963 | Pierre | E02B 3/129 |
| | | | | 405/29 |
| 3,380,253 | A * | 4/1968 | Vita | E02B 3/129 |
| | | | | D25/113 |
| 3,456,446 | A * | 7/1969 | Sugiaki | E02B 3/129 |
| | | | | D25/113 |
| 3,636,713 | A * | 1/1972 | O'Neill | E02B 3/129 |
| | | | | 405/29 |
| 5,190,403 | A * | 3/1993 | Atkinson | E02B 3/129 |
| | | | | 405/21 |
| 5,556,230 | A * | 9/1996 | Turk | E02B 3/129 |
| | | | | 405/21 |
| D722,389 | S * | 2/2015 | Armon | D25/113 |
| D789,557 | S * | 6/2017 | Kim | D25/113 |
| D826,430 | S * | 8/2018 | Armon | A63H 33/00 |
| | | | | D25/113 |
| 2017/0175349 | A1 * | 6/2017 | Davis | E01F 15/086 |

* cited by examiner

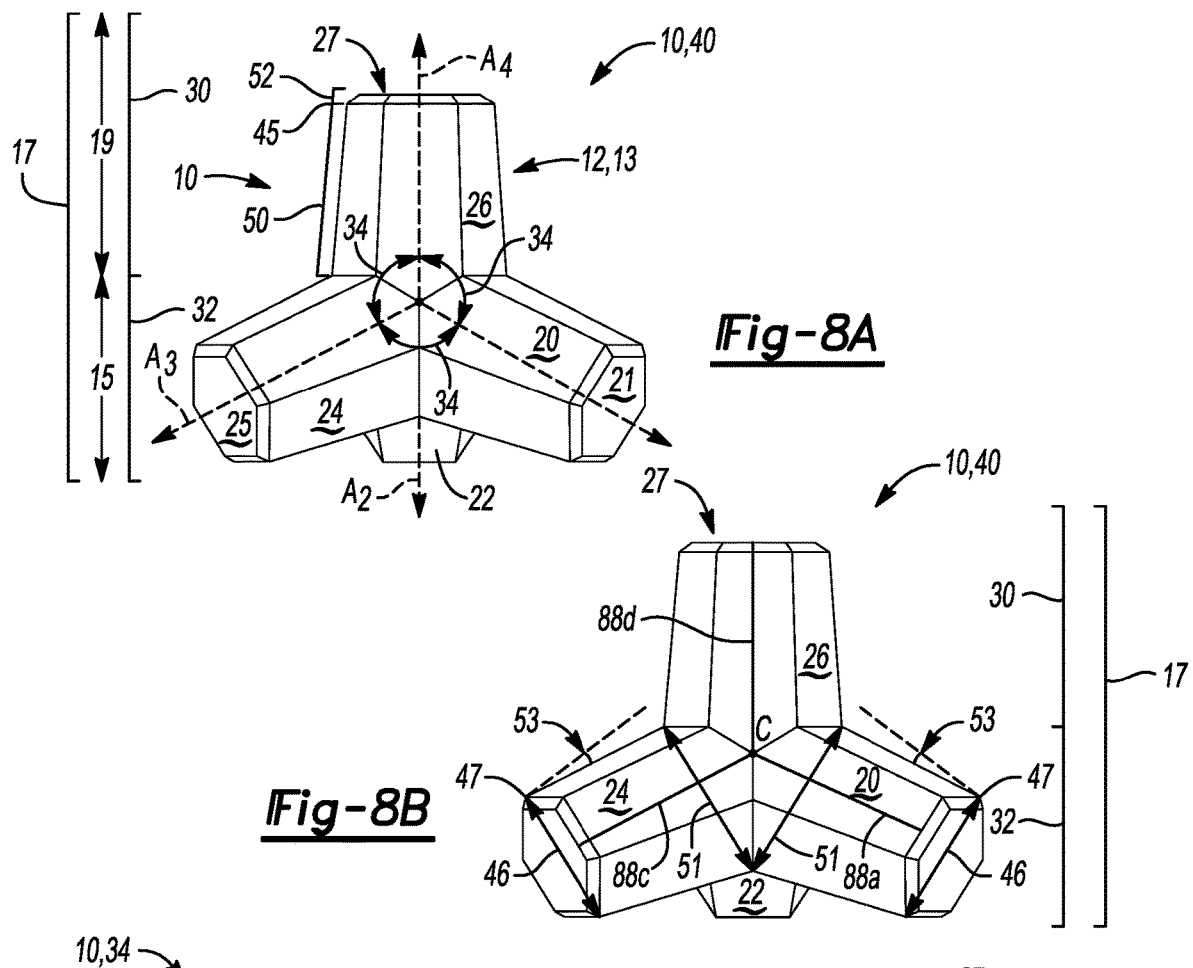
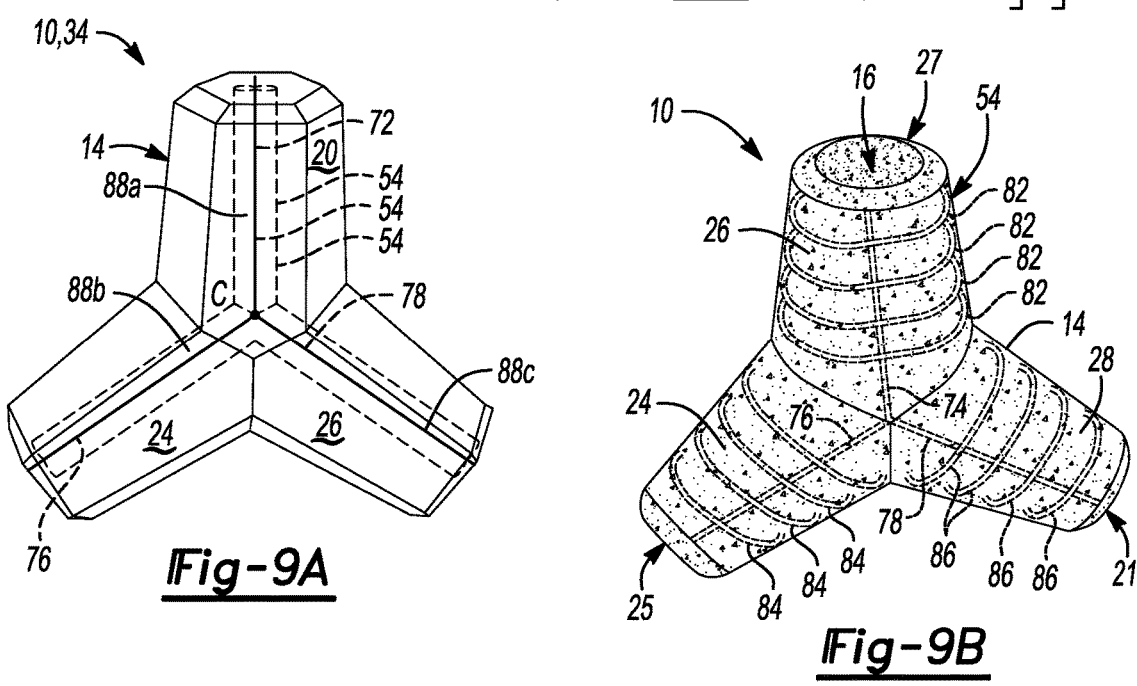

STRUCTURAL BARRIER AND A METHOD OF INSTALLATION THEREOF

CROSS-REFERENCE TO RELATED APPLICATIONS

This application claims the benefit of U.S. patent application Ser. No. 17/015,703 filed Sep. 9, 2020, U.S. Provisional Application No. 62/898,769, filed Sep. 11, 2019, and U.S. Provisional Application No. 62/898,771, filed Sep. 11, 2019, each of which is hereby incorporated by reference in its entirety.

TECHNICAL FIELD

The present disclosure relates to a structural barrier composed of one or more structural elements and methods of installation of the same.

BACKGROUND

This invention relates to structural elements for barriers for engineering uses such as river and canal engineering, erosion control, embankment and levee construction, and construction for protection of sea coasts, harbors, and lakeshores.

Structural barriers of various configurations have been utilized for such purposes. However, while a large variety of block-like structures have been proposed and made, e.g., jersey barriers, caltrops, X-blocs, etc., these conventional blocks have not been entirely satisfactory. Furthermore, known blocks and barriers, in general, have entailed high production costs, limited options for transport and installation, and the modes of combination between like blocks or barriers have been limited.

SUMMARY

A structural barrier and methods of installation for the same are provided. The structural barrier may comprise a plurality of structural elements or energy absorbing devices arranged such that the structural elements are configured to receive and interlock with one another to form the structural barrier. The structural elements may be solid-state structural elements comprised of a concrete material, a ballistic material, aggregate material coupled by a bonding adhesive or the like. The structural elements may alternatively be a portable and collapsible structural elements, wherein the element body comprises an outer skin defining an interior void space, such that upon set-up or installation the interior void space may be filled with a filler substance onsite after positioning of the outer skin in the selected installation location.

A single structural element may be referred to as a tetrapod, as the structural element more particularly comprises an element body having an exterior surface and an interior center. The element body may be portioned into a first bisection and a second bisection. The element body may further define a plurality of extension portions, namely a first extension portion, a second extension portion, a third extension portion, and a fourth extension portion, each positioned on a unique axis that extend in a predetermined direction along the respective axis outwardly from the interior center to a distal end.

Each of the respective unique axes defines an angle with each of the other unique axes at the interior center, such that the angle between each of the respective axes is substantially equivalent. Accordingly, the first bisection includes three of the four extension portions, such that the respective distal ends thereof are positioned on a geometric plane, and the second bisection includes the one remaining extension portion, such that the respective extension portion and the respective axis in the second bisection extend outwardly from the interior center to the respective distal end orthogonal to the geometric plane. In this way, the structural element has the capability of maintaining an identical orientation and a low center of gravity in each of four different resting positions.

The structural element alone or in a plurality thereof may serve as a traversal impediment, energy absorbing device, or more particularly the structural barrier claimed herein, wherein the structural barrier is one of a pedestrian barrier, vehicular barrier, anti-tank obstacle, ballistic barrier, construction barrier, an eco-barrier for erosion control, or the like. When organized in a plurality, the structural elements may be randomly organized and stacked, such that the respective extension portions of the structural elements interlock with one another to form an extended barrier or obstacle. Further, when each structural element is interlocked with at least one of the other structural elements of the structural barrier, the respective extension portions define a plurality of void spaces therebetween.

The methods of installation for the structural barrier may include the steps of: providing a negative form, in the form of the structural element; applying an outer skin material to the external form surface of the negative form until the outer skin material has a thickness of greater than 0.125 inches; removing the outer skin from the negative form; filling the interior void space defined by the outer skin with a filler substance, wherein the filler substance is at least one of a fluid, an aggregate, a soil, or a combination thereof; selecting an installation location and orientation for the structural element; and positioning the structural element in the installation location.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

FIG. 8A is a schematic, fourth perspective view of a third example configuration of the structural element, appearing as a tetrapod and having extension elements with polygonal cross-sections.

FIG. 8B is a schematic, fourth perspective view of a third example configuration of the structural element, appearing as a tetrapod and having extension elements with polygonal cross-sections.

FIG. 9A is a schematic perspective view of a third example configuration of the structural element having a first example reinforcement structure therein.

FIG. 9B is a schematic perspective view of a second example configuration of the structural element having a second example reinforcement structure therein.

DETAILED DESCRIPTION

Figure 1:
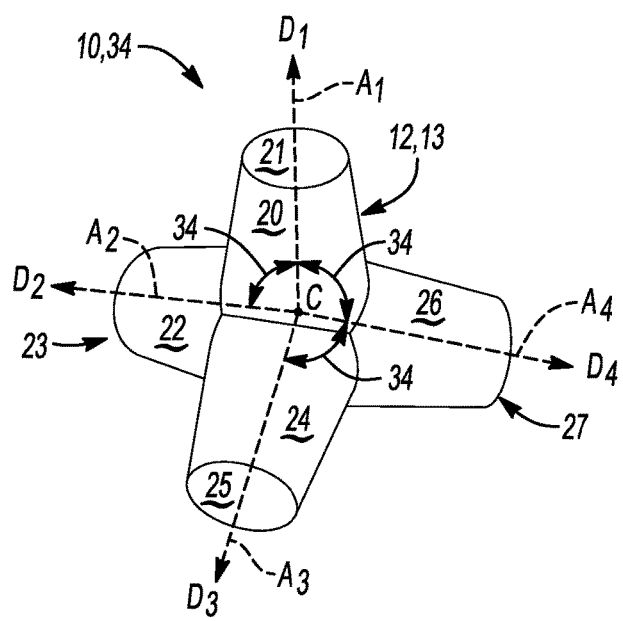
FIG. 1 is a schematic first perspective view of a first example configuration of the structural element, appearing as a tetrapod and having extension elements with substantially circular cross-sections.

While the present disclosure may be described with respect to specific applications or industries, those skilled in the art will recognize the broader applicability of the disclosure. Those having ordinary skill in the art will recognize that terms such as "above," "below," "upward," "downward," etc., are used descriptively of the figures, and do not represent limitations on the scope of the disclosure, as defined by the appended claims. Any numerical designations, such as "first" or "second" are illustrative only and are not intended to limit the scope of the disclosure in any way.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

The terms "a," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

The following discussion and accompanying figures disclose various configurations of structural elements and pluralities of structural elements configured to form traversal impediments or energy absorbing devices, such as a pedestrian barrier, vehicular barrier, anti-tank obstacle, ballistic barrier, construction barrier, an ecobarrier for erosion control, or the like. The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. For example, although the structural element is depicted as a tetrapod in the associated Figures, concepts associated with the configurations and methods may be applied to various types of structural elements of varying configurations. Further, non-tetrapod structural elements may also incorporate concepts discussed herein.

In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

In the vehicular management, pedestrian management, crowd control, and roadway construction context, conventional barriers may be large, heavy, and difficult to transport, and few maintain the desired traffic management features while still providing an energy absorption and dissipation function for the safety of the pedestrian, driver, and/or surrounding bystanders in the event a pedestrian or a vehicle contacts the barrier. The structural barrier 120 formed via a plurality of structural elements 10 of the present disclosure cures these deficiencies and has industrial applicability as a traffic barrier and/or a crowd control device.

In a water management context, e.g., wave breaking, river and canal engineering, erosion control, construction for protection of sea coasts, harbors, and lakeshores, etc. conventional structural elements and applications such as concrete blocks and boulders tend to come dislodged over time by force of water and wave action, whereby they cannot function effectively as wave dissipation means or to control erosion. As such, the structural barrier 120 formed via a plurality of structural elements 10 described herein has industrial applicability as a barrier for engineering uses such as river and canal engineering, erosion control, embankment and levee construction, construction for protection of sea coasts, harbors, and lakeshores.

Referring to the drawings, the elements shown in FIGS. 1-23, are not necessarily to scale or proportion. Accordingly, the particular dimensions and applications provided in the drawings presented herein are not to be considered limiting. Further, referring to the drawings, a structural element 10 is provided. In a general sense, the structural element 10 of the present disclosure includes a structural element 10 and energy absorbing device, which may be a solid-state structural element 10 comprised of a predetermined moldable, formable, and/or curable materials, for example, a concrete material, a ballistic material, or the like. The structural element 10 may also be a solid-state structural element 10 comprised of an aggregate material comprising a plurality of aggregate pieces bonded together with an adhesive.

The structural element 10 may alternatively be a portable and collapsible structural element 10 wherein the element body 12 comprises an outer skin 14 defining an interior void space 16, such that the outer skin 14 may be easily transported and then upon set-up or installation at a selected installation location, the interior void space 16 defined by the outer skin 14 may be filled with a filler substance on-site. The filler substance may include, a fluid such as water, an aggregate such as sand, a soil, or another filler substance depending upon the particular application of the barrier 120 and/or the structural element 10 in use, considering, for example, the type, size and function of the object or objects being barricaded, impeded or obstructed, energy absorption requirements, ballistic resistance, permanency of the structure, etc.

As shown by example in FIGS. 1-8B, a single structural element 10 may be referred to as a tetrapod, as the structural element 10 comprises an element body 12, which is divided into a first bisection 32 and a second bisection 30. The element body 12 further comprises a plurality of extension portions 20, 22, 24, 26 each positioned on a unique axis A1, A2, A3, A4 and extending in a predetermined direction along the respective axis A1, A2, A3, A4 outwardly from the interior center C to a distal end 21, 23, 25, 27. Accordingly, the first bisection 32 includes three of the four extension portions 20, 22, 24, 26, such that the respective distal ends 21, 23, 25, 27 thereof are positioned on and in contact with a geometric plane P, and the second bisection 30 includes the one remaining extension portion 20, 22, 24, 26, such that the respective extension portion and the respective axis in the second bisection 30 extend outwardly from the interior center C of the element body 12 to the respective distal end 21, 23, 25, 27 and orthogonal to the plane P.

Each of the respective axes defines an angle 34 with each of the other axes at the interior center C, such that the angle 34 between each of the respective axes is substantially equivalent. In this way, the structural element 10 maintains an identical orientation and a low center of gravity in each of four different resting positions 34, 36, 38, 40.

The structural element 10 alone or in a plurality thereof 120 (FIGS. 18-21) may serve as a traversal impediment or energy absorbing device, such as a pedestrian barrier, vehicular barrier, anti-tank obstacle, ballistic barrier, construction barrier, or the like. A plurality of structural elements 120 may also serve as a jetty, breakwater, or erosion control device portioned proximate to a shoreline.

Referring first to FIGS. 1-8B, the structural element 10 may include an element body 12 having an exterior surface 13 and an interior center C. The element body 12 may further include a plurality of extension portions 20, 22, 24, 26 that extend outwardly from the interior center C to a distal end 21, 23, 25, 27 along a length 88. Each extension portion 20, 22, 24, 26 may be disposed on an individual axis A1, A2, A3, A4, such that the respective extension portion 20, 22, 24, 26 extends outwardly from the interior center C in a predetermined direction D1, D2, D3, D4 to the distal end 21, 23, 25, 27.

Collectively, the axes A1, A2, A3, A4 define a plurality of axes, such that each axis defines and an angle 34 with each of the other axes at the interior center C, such that the angle 34 between each of the respective axes A1, A2, A3, A4 is substantially equivalent.

More particularly, the plurality of extension portions 20, 22, 24, 26 may include, a first extension portion 20, a second extension portion 22, a third extension portion 24, and a fourth extension portion 26. The first extension portion 20 may be disposed on a first axis A1, such that the first extension portion 20 extends outwardly from the interior center C in a first predetermined direction D1 to a first distal end 21 along a first length 88a. The second extension portion 22 may be disposed on a second axis A2, such that the second extension portion 22 extends outwardly from the interior center C in a second predetermined direction D2 to a second distal end 23 along a second length 88b. The third extension portion 24 may be disposed on a third axis A3, such that the third extension portion 24 extends outwardly from the interior center C in a third predetermined direction D3 to a third distal end 25 along a third length 88c. The fourth extension portion 26 may be disposed on a fourth axis A4, such that the fourth extension portion 26 extends outwardly from the interior center C in a fourth predetermined direction D4 to a fourth distal end 27 along a fourth length 88d. Each of the first predetermined direction D1, the second predetermined direction D2, the third predetermined direction D3, and the fourth predetermined direction D4 are different from each of the other predetermined directions D1, D2, D3, D4.

In accordance with the above description and FIG. 1-8B, a single structural element 10 may be referred to as a tetrapod. More particularly, the structural element 10 comprises an element body 12, which is divided into the first bisection 32 and the second bisection 30, wherein the first bisection 32 includes three of the four extension portions 20, 22, 24, 26 or legs, such that the respective distal ends 21, 23, 25, 27 thereof are positioned on a geometric plane P, and the second bisection 30 includes one remaining extension portion 20, 22, 24, 26 or leg, such that the respective extension portion in the second bisection 30 and the respective axis A1, A2, A3, A4 in the second bisection 30 extend outwardly from the interior center C of the element body 12 to the respective distal end 21, 23, 25, 27 orthogonal to the geometric plane P.

Figure 2:
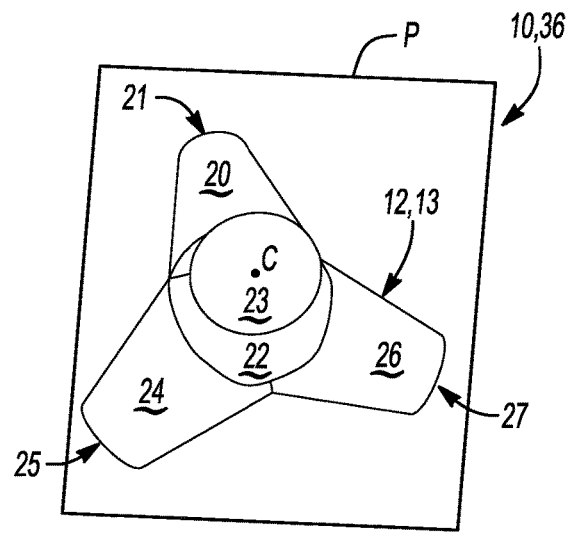
FIG. 2 is schematic, second perspective view of a first example configuration of the structural element, appearing as a tetrapod and having extension elements with substantially circular cross-sections.
Figure 3:
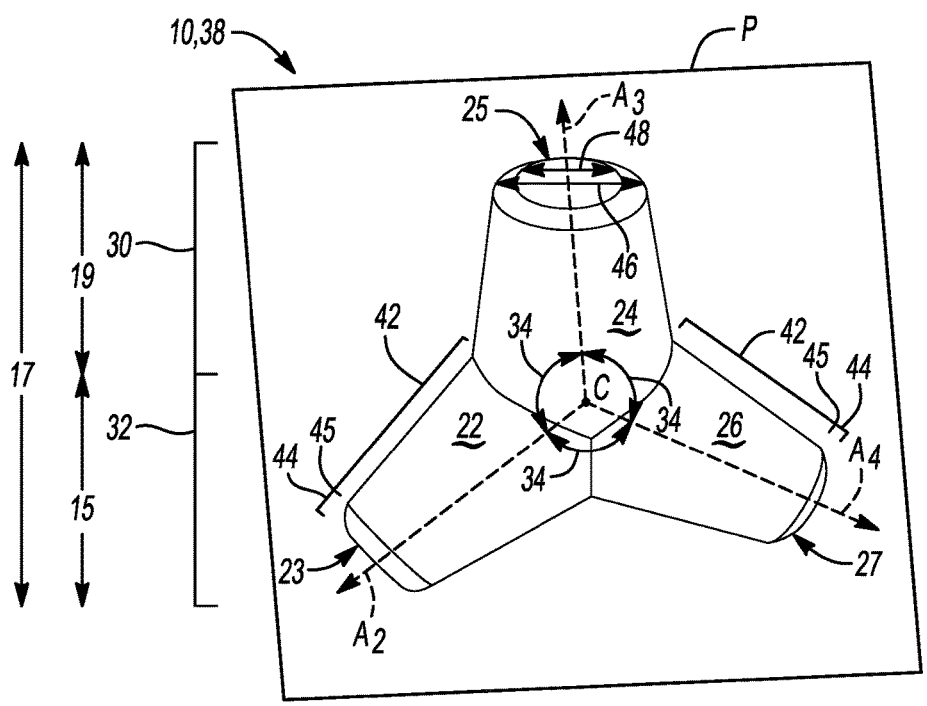
FIG. 3 is a schematic, first perspective view of a second example configuration of the structural element, appearing as a tetrapod and having extension elements with substantially circular cross-sections.

As shown by example in FIGS. 3 and 8A-8B, the first bisection 32 may have a first height 15 and the second bisection 30 may have a second height 19. Collectively, the first bisection 32 and the second bisection 30 may define an overall height 17. The structural element 10 may occupy one of four resting positions, namely, a first resting position 34, a second resting position 36, a third resting position 38, and a fourth resting position 40. In this way, when the respective lengths 88a, 88b, 88c, and 88d are substantially equivalent, the structural element 10 maintains an identical orientation and a low center of gravity in each of four different resting positions 34, 36, 38, 40 as illustrated in FIGS. 1-8B.

Figure 5:
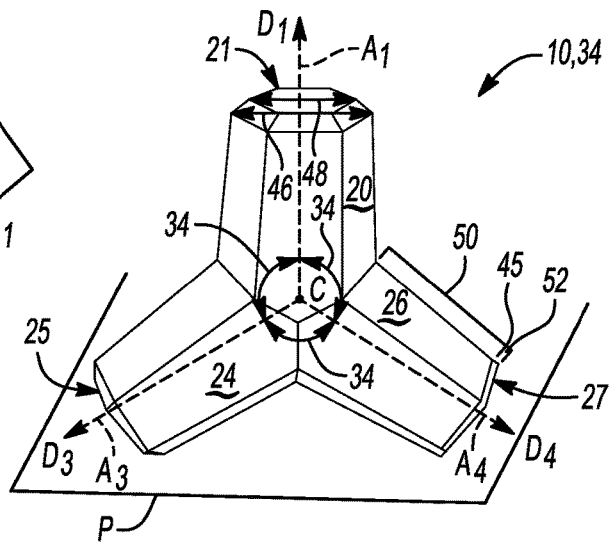
FIG. 5 is a schematic, first perspective view of a third example configuration of the structural element, appearing as a tetrapod and having extension elements with polygonal cross-sections.

As shown by example in FIGS. 1 and 5, in the first resting position 34, the first bisection 32 includes each of the second extension portion 24, the third extension portion 26, and the fourth extension portion 28. In this way, the second distal end 23, the third distal end 25, and the fourth distal end 27 are positioned in contact with geometric plane P. The second bisection 30 includes the first extension portion 20, such that the first extension portion 20 and the first axis A1 extend outwardly from the interior center C to the first distal end 21 along the first length 88a orthogonal to the geometric plane P.

Figure 6:
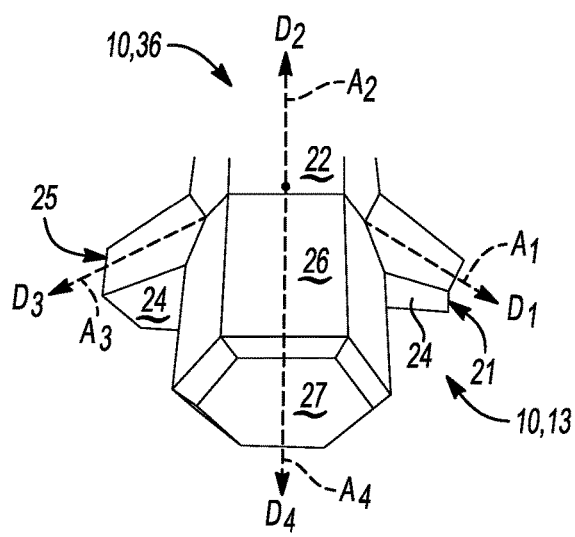
FIG. 6 is a schematic, second perspective view of a third example configuration of the structural element, appearing as a tetrapod and having extension elements with polygonal cross-sections.
Figure 7:
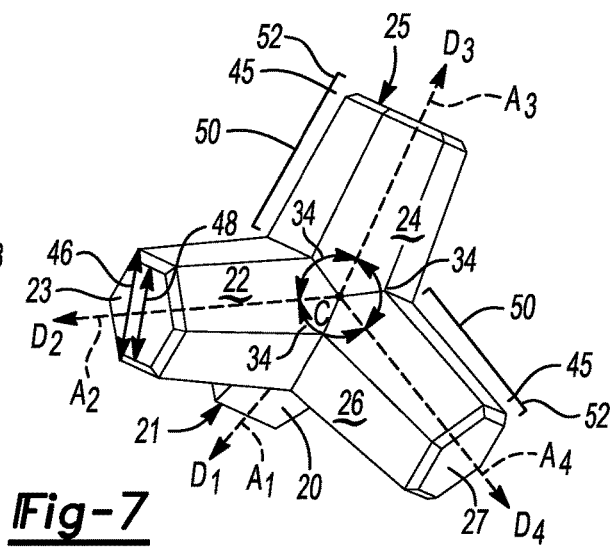
FIG. 7 is a schematic, third perspective view of a third example configuration of the structural element, appearing as a tetrapod and having extension elements with polygonal cross-sections.

As shown by example in FIGS. 2 and 6, in the second resting position 36, the first bisection 32 includes each of the first extension portion 20, the third extension portion 24, and the fourth extension portion 26. In this way, first distal end 21, the third distal end 23, and the fourth distal end 27 are positioned in contact with the geometric plane P. The second bisection 30 includes the second extension portion 22, such that the second extension portion 22 and the second axis A2 extend outwardly from the interior center C to the second distal end 23 along the second length 88b orthogonal to geometric plane P.

As shown by example in FIG. 3, in the third resting position 38, the first bisection 32 includes each of the first extension portion 20, the second extension portion 22, and the fourth extension portion 26. In this way, the first distal end 21, the second distal end 23, and the fourth distal end 27 are positioned in contact with the geometric plane P. The second bisection 30 includes the third extension portion 24, such that the third extension portion 24 and the third axis A3 extend outwardly from the interior center C to the third distal end 25 along the third length 88c orthogonal to the geometric plane P.

Figure 4:
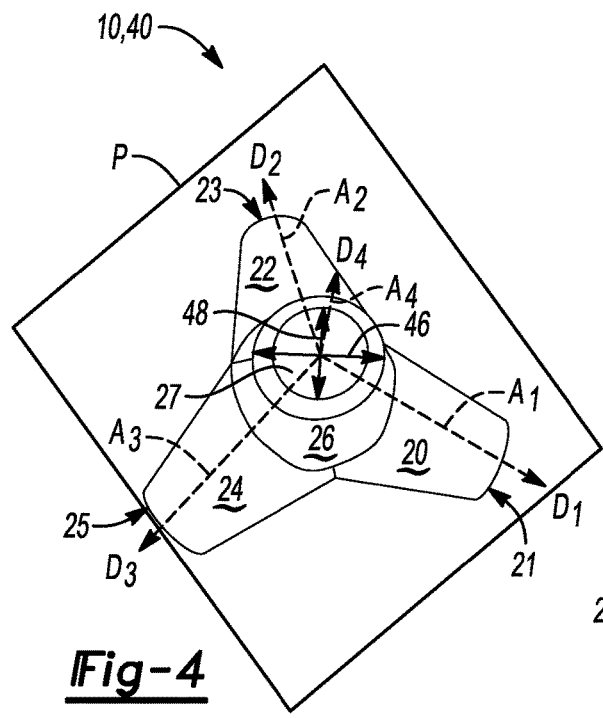
FIG. 4 is a schematic, second perspective view of a second example configuration of the structural element, appearing as a tetrapod and having extension elements with substantially circular cross-sections.

As shown by example, in FIGS. 4 and 8A, in the fourth resting position 40, the first bisection 32 includes each of the first extension portion 20, the second extension portion 22, and the third extension portion 24. In this way, the first distal end 21, the second distal end 23, and the third distal end 25 are positioned in contact with the geometric plane P. The second bisection 30 includes the fourth extension portion 26, such that the fourth extension portion 26 and the fourth axis A4 extend outwardly from the interior center C to the fourth distal end 27 along the fourth length 88d orthogonal to the geometric plane P.

In some examples, the respective extension portion 20, 22, 24, 26, embodied in the second bisection 30 may be of a substantially different length 88a, 88b, 88c, 88d than each of the other extension portions 20, 22, 24, 26, which are positioned in the first bisection 30. In some embodiments the extension portion 20, 22, 24, 26 within the second bisection 30 may have a length 88a, 88b, 88c, 88d that is substantially greater or longer than the length 88a, 88b, 88c, 88d of each of the other extension portions in the first bisection 32, which would provide for an increase in the overall height 17 of the structural element 10. In other embodiments the extension portion 20, 22, 24, 26 within the second bisection 30 may have a length 88a, 88b, 88c, 88d that is substantially shorter than the length 88a, 88b, 88c, 88d of each of the other extension portions in the first bisection 32, which may provide for a decrease in the overall height 17 of the structural element 10.

In examples wherein the respective extension portion 20, 22, 24, 26, embodied in the second bisection 30 may be of a substantially different length 88a, 88b, 88c, 88d than each of the other extension portions 20, 22, 24, 26 contained within the first bisection 32, in the first resting position 34 (FIGS. 1 and 5), the second bisection 30 includes the first extension 20 portion, such that the first extension portion 20 may define a length 88a that is substantially longer or shorter than the lengths 88b, 88c, 88d of each of the second extension portion 22, the third extension portion 24, and the fourth extension portion 26. In the second resting position 36 (FIGS. 2 and 6), the second bisection 30 includes the second extension portion 22, such that the second extension portion 22 may define a length 88b that is substantially longer or shorter than the lengths 88a, 88c, 88d of each of the first extension portion 20, the third extension portion 24, and the fourth extension portion 26. In the third resting position 38

(FIG. 3), the second bisection 30 includes the third extension portion 24, such that the third extension portion 24 may define a length 88c that is substantially longer or shorter than the lengths 88a, 88b, 88d of each of the first extension portion 20, the second extension portion 22, and the fourth extension portion 26. In the fourth resting position 40 (FIGS. 4 and 8A), the second bisection 30 includes the fourth extension portion 26, such that the fourth extension portion 26 may define a length 88d that is substantially longer or shorter than the lengths 88a, 88b, 88c of each of the first extension portion 20, the second extension portion 22, and the third extension portion 24.

As shown by example in FIGS. 1-4, each of the extension portions 20, 22, 24, 26 may be substantially conical, in that each of the first extension portion 20, the second extension portion 22, the third extension portion 24, and the fourth extension portion 26 is formed as a truncated cone. As shown by example, in FIGS. 1 and 2, each of the first distal end 21, the second distal end 23, the third distal end 25, and the fourth distal end 27 maintain a flattened and substantially circular cross-sectional configuration.

As shown by example in FIGS. 3 and 4, each of the extension portions 20, 22, 24, 26 may be substantially conical, in that each of the first extension portion 20, the second extension portion 22, the third extension portion 24, and the fourth extension portion 26 is formed as a plurality of truncated cones. As shown in FIGS. 3 and 4, the distal ends 21, 23, 25, 27 each define a flattened and substantially-circular cross-sectional configuration.

The plurality of truncated cones may include a first truncated cone 42 and a second truncated cone 44. The first truncated cone 42 extends from the interior center C to an extension portion intermediate point 45. The respective extension portion 20, 22, 24, 26 has a first cross-sectional diameter 46 at the extension portion intermediate point 45. The second truncated cone 44 extends from the extension portion intermediate point 45 to the distal end 21, 23, 25, 27. The respective extension portion 20, 22, 24, 26 has a second cross-sectional diameter 48 at the distal end 21, 23, 25, 27. The second cross-sectional diameter 48 is smaller than the first cross-sectional diameter 46 of each of the extension portions 20, 22, 24, 26.

The first cross-sectional diameter 46 and the second cross-sectional diameter 48 may be smaller than the interior base cross-sectional diameter 51 (FIG. 8B) of the respective extension portion 20, 22, 24, 26, thereby defining a taper from the interior center C to the respective distal end 21, 23, 25, 27. The degree of the taper may be defined by angle 53 (FIG. 8B) defined between the tapered exterior surface of the respective extension portion 20, 22, 24, 26 and a line parallel to the respective axis A1, A2, A3, A4 running through the highest point 47 on top of the respective extension portion 20, 22, 24, 26 at the intermediate point 45.

Alternatively, as shown in FIGS. 5-8B, each of the first extension portion 20, the second extension portion 22, the third extension portion 24, and the fourth extension portion 26 may be formed as a polygonal prism. As shown by example, in FIGS. 5-8B, each of the first distal end 21, the second distal end 23, the third distal end 25, and the fourth distal end 27 maintain a flattened, polygonal cross-sectional configuration. As shown in FIGS. 5-8B, the distal ends 21, 23, 25, 27 each define a flattened, polygonal, e.g., pentagonal, hexagonal, octagonal etc. cross-sectional configuration.

The polygonal prism may be a pentagonal prism, such that each of the first distal end 21, the second distal end 23, the third distal end 25, and the fourth distal end 27 maintain flattened pentagonal cross-sectional configuration. The polygonal prism may be a hexagonal prism, such that each of the first distal end 21, the second distal end 23, the third distal end 25, and the fourth distal end 27 maintain flattened hexagonal cross-sectional configuration. The polygonal prism may be an octagonal prism, such that each of the first distal end 21, the second distal end 23, the third distal end 25, and the fourth distal end 27 maintain flattened octagonal cross-sectional configuration.

In one example, as shown in FIGS. 5-8B, each of the first extension portion 20, the second extension portion 22, the third extension portion 24, and the fourth extension portion 26 is formed as a plurality of polygonal prisms. The plurality of polygonal prisms may include a first polygonal prism 50 and a second polygonal prism 52. The first polygonal prism 50 extends from the interior center C to an extension portion intermediate point 45. The respective extension portion 20, 22, 24, 26 has a first cross-sectional diameter 46 at the extension portion intermediate point 45. The second polygonal prism 52 extends from the extension portion intermediate point 45 to the distal end 21, 23, 25, 27. The respective extension portion 20, 22, 24, 26 has a second cross-sectional diameter 48 at the distal end 21, 23, 25, 27. The second cross-sectional diameter 48 is smaller than the first cross-sectional diameter 46 of each of the extension portions 20, 22, 24, 26.

The first cross-sectional diameter 46 and the second cross-sectional diameter 48 may further be smaller than the interior base cross-sectional diameter 51 of the respective extension portion. 20, 22, 24, 26, thereby defining a taper from the interior center C to the respective distal end 21, 23, 25, 27. The degree of the taper may be defined by angle 53 (FIG. 8B) defined between the tapered exterior surface of the respective extension portion 20, 22, 24, 26 and a line parallel to the respective axis A1, A2, A3, A4 running through the highest point 47 on top of the respective extension portion 20, 22, 24, 26 at the intermediate point 45.

Structural elements 10 having extension portions 20, 22, 24, 26 formed as polygonal prisms 50, 52, may have advantages over structural elements 12 having extension portions 20, 22, 24, 26 formed as truncated cones 42, 44 in that structural elements 12 having extension portions 20, 22, 24, 26 formed as a polygonal prisms may be more stable and more difficult to topple or move from one resting position 34, 36, 38, 40 to another resting position 34, 36, 38, 40. Further, structural elements 10 having an extension portion 20, 22, 24, 26 in the second bisection 30 having a substantially shorter length 88a, 88b, 88c, 88d that the extension portions 20, 22, 24, 26 of the first bisection 32, may be substantially more stable and more difficult to topple or move from one resting position 34, 36, 38, 40 to another resting position 34, 36, 38, 40. Structural elements 10 having extension portions 20, 22, 24, 26 formed as a polygonal prisms may be particularly advantageous in defense applications due to the unique geometry thereof being particularly apt to high-center a vehicle upon contact, such as when used as part of a traffic barrier that comprises and anti-tank obstacle as described herein below.

The structural element 10 of the present disclosure may be a solid-state structural element 10 comprised of a predetermined moldable, formable, and/or curable material, for example, a concrete material, a ballistic material, or the like. The structural element 10 may also be a solid-state structural element 10 comprised of an aggregate material comprising a plurality of aggregate pieces bonded together with an adhesive. Alternatively, the structural element 10 may be a portable and collapsible structural element 10 wherein the element body 12 comprises an outer skin 14 defining an interior void space 16, such that the outer skin 14 may be easily transported and then upon set-up or installation the interior void space 16 may be filled with a filler substance on site in the selected installation location.

In a first example wherein, the structural element 10 is a solid-state structural element 10, the structural element 10 may be comprised of a predetermined moldable, formable, and/or curable material, for example, a concrete material, a ballistic material, or the like. The structural element 10 may further comprise a reinforcing structure 54 as shown by example in FIGS. 9A and 9B. The reinforcing structure 54 may be comprised of a metallic material, for example steel rebar. The steel rebar may have a cross-sectional diameter of 0.5 inches or greater.

As shown by example in FIG. 9A, the steel rebar reinforcing structure 54 may comprise a plurality of flange elements, namely a first plurality of flange elements 72, a second plurality of flange elements 74, a third plurality of flange elements 76, and a fourth plurality of flange elements 78 that each extend outwardly from the interior of the element body 12 and through one of the extension portions 20, 22, 24, 26.

Each extension portion 20, 22, 24, 26 may contain at least one flange element 72, 74, 76, 78 of the reinforcing structure 54 extending therethrough. In this way, the first plurality of flange elements 72 is disposed on the first axis A1 and extends outwardly from the interior center C toward the first distal end 21 along the length 88*a*. The second plurality of flange elements 74 is disposed on the second axis A2 and extends outwardly from the interior center C toward the second distal end 23 along the length 88*b*. The third plurality of flange elements 76 is disposed on the third axis A3 and extends outwardly from the interior center C toward the third distal end 25, along the length 88*c*. The fourth plurality of flange elements 78 is disposed on the fourth axis A4 and extends outwardly from the interior center C toward the fourth distal end 27 along the length 88*d*.

The reinforcement structure 54 may further comprise a plurality of circumferential elements 80, 82, 84, 86 (FIG. 9B) coupled to the plurality of flange elements 72, 74, 76, 78. A first plurality of circumferential elements 80 is coupled to the first plurality of flange elements 72 along the length 88*a* of the first extension portion 20. The first plurality of circumferential elements 80 may be positioned evenly and equidistantly along the length 88*a* of the first extension portion 20 between the interior center C and the first distal end 21. A second plurality of circumferential elements 82 is coupled to the second plurality of flange elements 74 along a length 88*b* of the second extension portion 22. The second plurality of circumferential elements 82 may be positioned evenly and equidistantly along the length 88*b* of the second extension portion 22 between the interior center C and the second distal end 23. A third plurality of circumferential elements 84 is coupled to the third plurality of flange elements 76 along a length 88*c* of the third extension portion 24. The third plurality of circumferential elements 84 may be positioned evenly and equidistantly along the length 88*c* of the third extension portion 24 between the interior center C and the third distal end 25. A fourth plurality of circumferential elements 86 is coupled to the fourth plurality of flange elements 78 along a length 88*d* of the fourth extension portion 26. The fourth plurality of circumferential elements 78 may be positioned evenly and equidistantly along the length 88*d* of the fourth extension portion 26 between the interior center C and the fourth distal end 27.

The solid-state, structural element 10 may be formed via a formation mold 56, as shown in FIGS. 10-14. The formation mold 56 may be a metallic mold 56 formed of steel, aluminum, or the like. The mold 56 may be formed from a mold set containing five mold portions 58, 60, 62, 64, 68, namely three upper mold portions 58, 60, 62 one lower mold portion 64, and a mold base 68. The three upper mold portions 58, 60, 62 and the lower mold portion 64 define an interior mold space 11 therebetween. The three upper mold portions 58, 60, 62 and the lower mold portion 64 define an inwardly facing mold surface 94 flush with the interior mold space 11 and an external mold surface 96.

The reinforcement structure 54 may be placed upon the lower mold portion 64 in contact with the inwardly facing mold surface 94 within the interior mold space 11. Each of the three upper mold portions 58, 60, 62 are bolted and pinned together via flange elements 98 to form the mold upper, such that the mold upper is placed about the reinforcement structure 54 and bolted and pinned to the lower mold portion 64 via substantially similar flange elements 98. The assembled mold form 56 is disposed upon mold base 68.

The solid-state structural element 10 is then formed via injecting the predetermined moldable, formable, and/or curable material into the interior mold space 11 such that the material envelopes the reinforcing structure 54 and expands to contact each of the mold portions 58, 60, 62, 64. The predetermined moldable, formable, and/or curable material may be a concrete material, an aggregate material, a polymeric material, Nylon, a foam material such as a structural foam, or another solid-state material. In an example, wherein the material is a concrete material, the concrete material may have a design strength of about 4800 PSI and an approximate cure time of five (5) days. The material may also comprise a ballistic material, such as a ballistic slag material, a ballistic concrete, a ballistic Nylon, Kevlar, or the like configured to be stab-resistant and ballistic projectile resistant. In a non-limiting example, the structural element 10 may be comprised of a concrete-based composite material as disclosed by U.S. Provisional Application No. 62/898,771, filed Sep. 11, 2019, which is hereby incorporated by reference in its entirety.

In a second example wherein, the structural element 10 is a solid-state structural element 10, the structural element 10 may be comprised of an aggregate material having a plurality of aggregate pieces bonded together via an adhesive. More particularly, the plurality of aggregate pieces may be a plurality of recycled concrete pieces, a plurality of recycled slag material pieces, or a plurality of recycled ballistic material pieces, or the like. The adhesive may be a two-part glue and resin mixture or the like. The structural element 10 may further comprise a reinforcing structure 54 as shown by example in FIGS. 9A and 9B.

Figure 10:
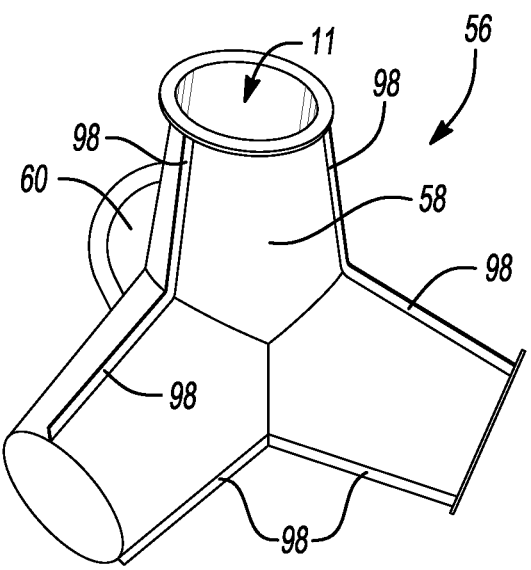
FIG. 10 is a schematic, first perspective view of an assembled combination positive and negative mold for forming the structural element.
Figure 11:
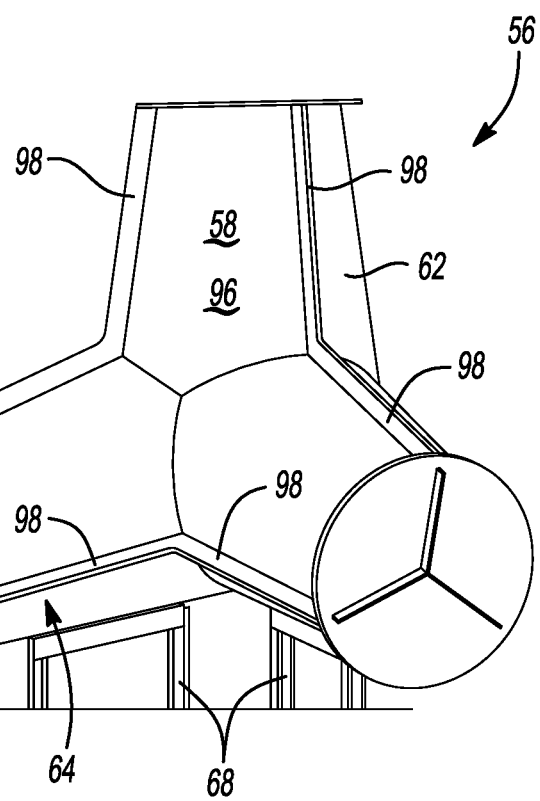
FIG. 11 is a schematic, perspective view of an assembled positive mold for forming the structural element disposed upon a base structure.
Figure 12:
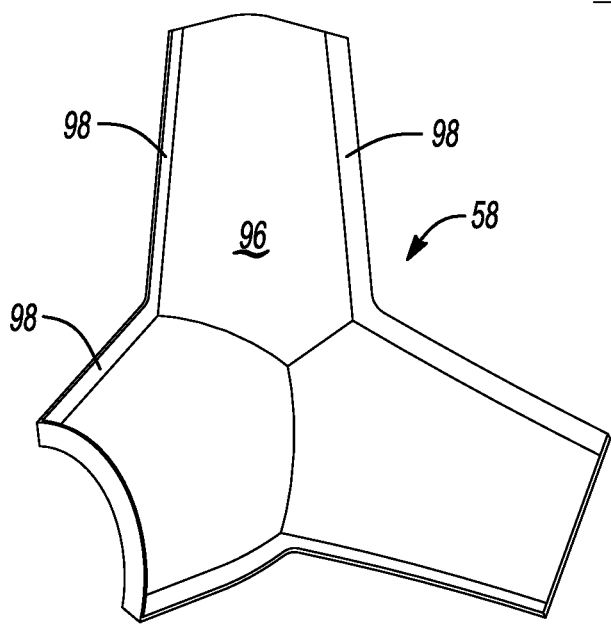
FIG. 12 is a schematic, perspective view of the external mold surface of one portion of the combination positive and negative mold for forming the structural element.
Figure 13:
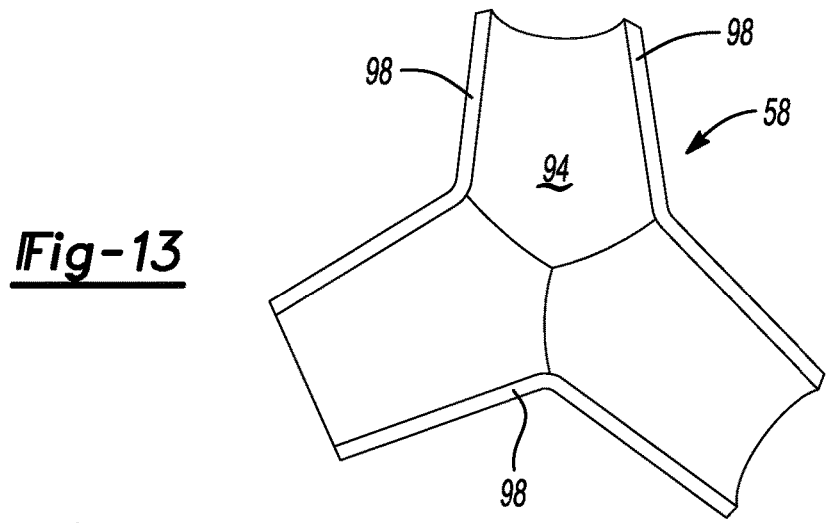
FIG. 13 is a schematic, perspective view of the internal mold surface of one portion of the combination positive and negative mold for forming the structural element.
Figure 14:
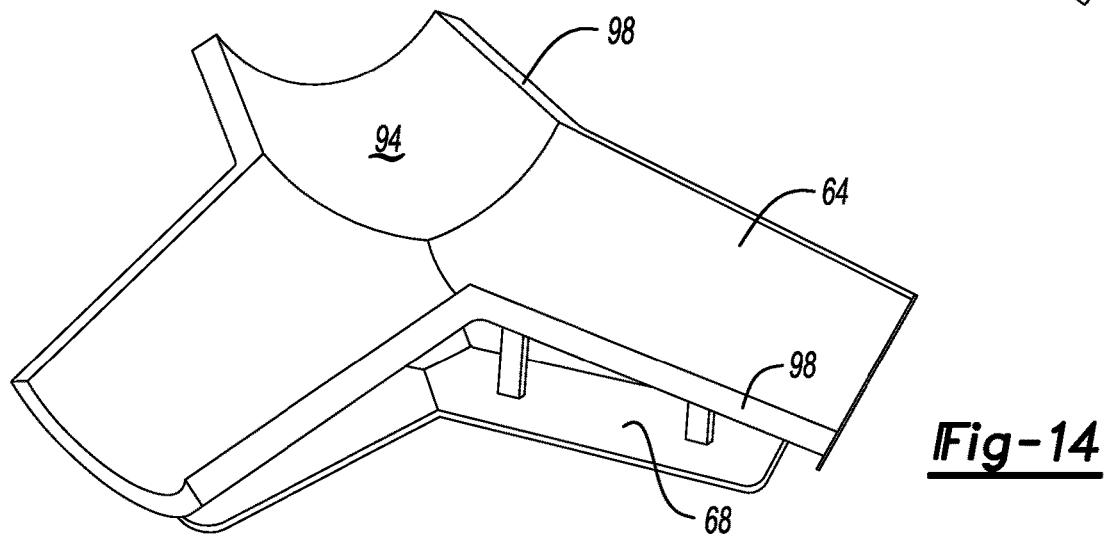
FIG. 14 is a schematic, perspective view of another portion of the positive mold for forming the structural element, wherein the portion is disposed on a base structure.
Figure 15:
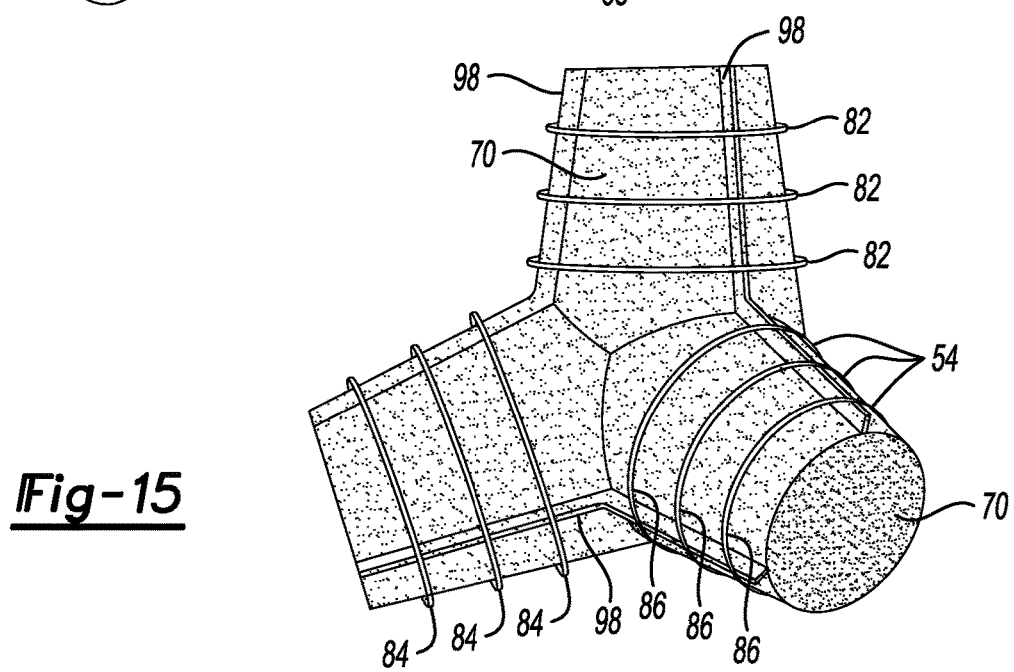
FIG. 15 is a schematic, perspective view of the negative mold for forming the structural element with a mesh and a second example reinforcement structure disposed thereon.
Figure 16:
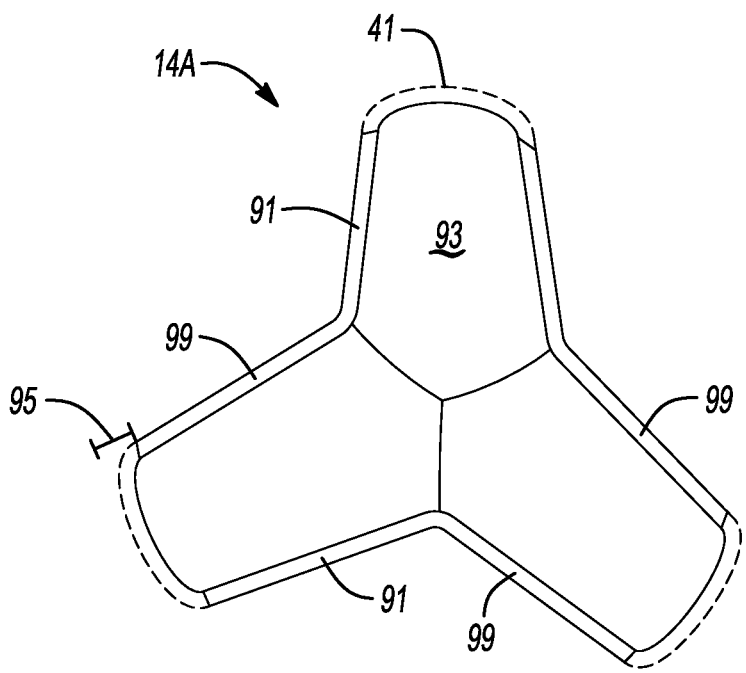
FIG. 16 is a schematic, perspective view of one portion of the outer skin formed of the polyurea based material.
Figure 17:
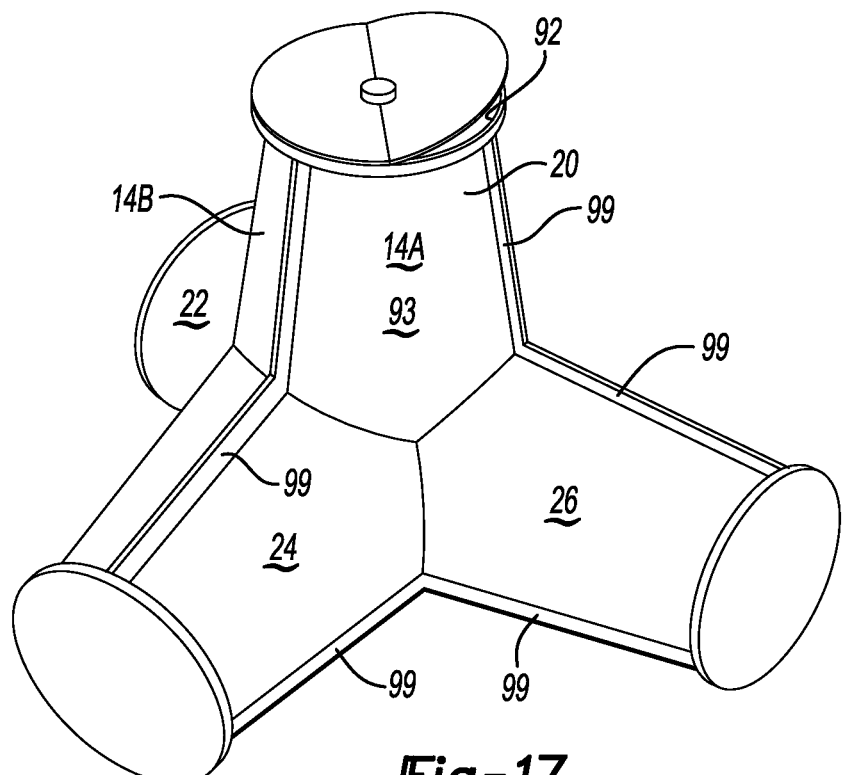
FIG. 17 is a schematic perspective view of the first portion, the second portion, the third portion, and the fourth portion of the outer skin formed of the polyurea based material fixedly coupled at the connection edges.
Figure 23:
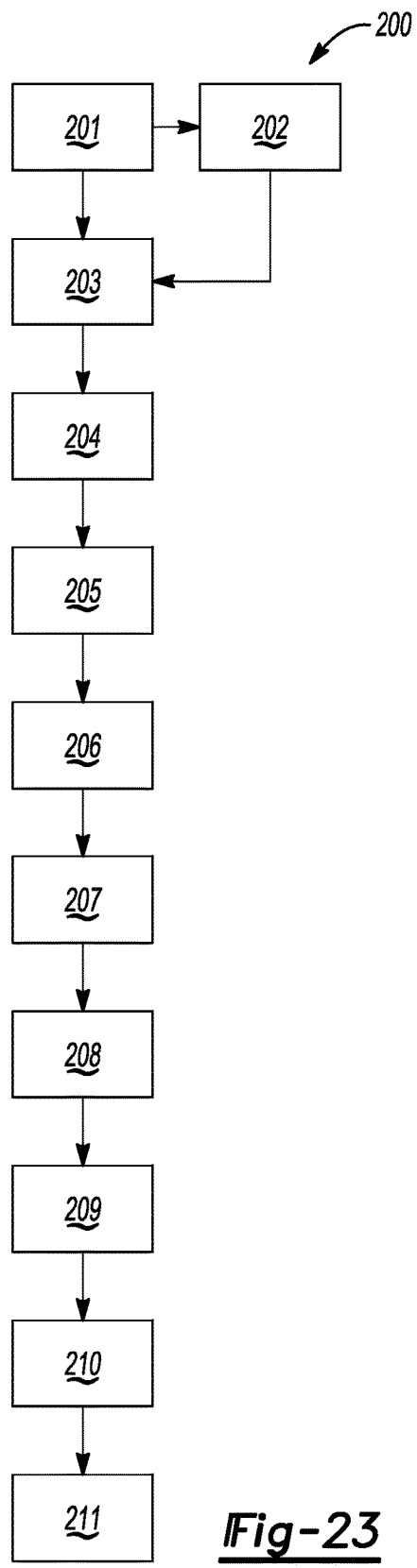
FIG. 23 is a flow diagram further detailing the method of installation for the structural barrier comprised of a second example structural element as detailed herein.

This second example solid-state, structural element 10 may be formed via the method 200 disclosed herein and detailed via the flow diagram in FIG. 23. The second example solid-state structural element 10 may be formed using a negative form 56 (FIGS. 10, 12, 15). As such, at step 201 a negative form 56 is provided, wherein the negative form 56 comprises a form body 58, 60, 62, 64, the form body 58, 60, 62, 64 having an external form surface 96 and an interior center. The negative form 56 may be formed of a fiberglass material or another suitable material. The negative mold 56 may further define the external mold surface 96.

Further, the negative form 56 mirrors the form of the structural element 10, in that the negative form 56 further defines a first extension portion 20 disposed on a first axis A1 and extending outwardly from the interior center in a first predetermined direction D1 to a first distal end 21, the first extension portion 20 defining a plurality of first extension portion flange members 98 that extend outwardly therefrom. A second extension portion 22 is disposed on a second axis A2 extending outwardly from the interior center in a second predetermined direction D2 to a second distal end 23, the second extension portion 22 defining a plurality of second extension portion flange members 98 that extend outwardly therefrom. A third extension portion 24 is disposed on a third axis A3 extending outwardly from the interior center in a third predetermined direction D3 to a third distal end 25, the third extension portion 24 defining a plurality of third extension portion flange members 98 that extend outwardly therefrom. A fourth extension portion 26 is disposed on a fourth axis A4 extending outwardly from the interior center in a fourth predetermined direction D4 to a fourth distal end 27, the fourth extension portion 26 defining a plurality of fourth extension portion flange members 98 that extend outwardly therefrom. Each of the first axis A1, the second axis A2, the third axis A3, and the fourth axis A4 defines an angle with each of the other axes at the interior center, and wherein the angle between each of the respective axes is substantially equivalent. In this way, the exterior mold surface 96 defines the interior void space 16 of the outer skin 14.

At step 202, optionally, the negative mold 56 may be covered with a mesh 70. In one example, the mesh 70 is a metallic or wire mesh, such as a metallic mesh 70, as shown by example in FIG. 15, such that the metallic or wire mesh 70 is in contact with external mold surface 96. Other mesh materials may be used, including, for example, the mesh 70 can be a polymeric-based mesh, such as a molded or woven plastic mesh, a textile-based mesh such as a woven or knotted fabric or rope mesh, or the like The mesh 70 may have varying cell size and configuration. The mesh is designed to allow the outer skin material to be applied to the external mold surface 96 to form the outer skin 14 without adhering to the negative mold 56.

At step 203, a silicone material is applied to the external mold surface 96 of the negative form 56 until the silicone material has a thickness 95 of greater than 0.125 inches, such that the silicone material forms an outer skin 14 in the form of the structural element 10 defining an interior void space 16. In one example, the silicone material is sprayed onto the external mold surface 96 of the negative mold 56.

At step 204 a curing or drying process is initiated for the silicone material, and upon completion of the curing or drying process, the silicone material may be removed from the negative mold 56, such that the outer skin 14 defines an interior void space 16. At step 205, the interior void space 16 defined by the outer skin 14 may be filled with a filler substance, wherein the filler substance is an aggregate comprising a plurality of aggregate pieces. The plurality of aggregate pieces may be a plurality of recycled concrete pieces, a plurality of recycled slag material pieces, or a plurality of recycled ballistic material pieces, or the like. The adhesive may be a marine glue or the like. The plurality of aggregate pieces may fill from about 75% to about 85% of the interior void space 16, such that the interior of the outer skin 14 comprises from about 15% to about 25% voids between the respective aggregate pieces. The filler substance may also include a metallic component and/or metallic-based particles, such as metal-based shot, metal-based pellets, such as iron-based pellets or taconite pellets, iron-based particles, or the like that may be inserted into the interior void space 16 to fill the respective voids between the aggregate pieces, and thereby add mass and/or weight to and/or increase the density of the solid-state structural element 10.

At step 206, an adhesive is injected into the interior void space 16 to bind the aggregate pieces and any metallic based particles to the other respective aggregate pieces within the outer skin 14. The adhesive may be a two-part glue and resin mixture, such as a marine glue or the like. One such suitable adhesive is a two-part glue and resin mixture that is commercially-available from BASF Group under the trade name Elastotite® Rock Glue 2K Resin. At step 207, a curing or drying process for the adhesive is initiated.

Upon completion of the curing or drying process for the adhesive, and at step 208, the outer skin 14 formed of the silicone material may be removed from the bonded combination of aggregate pieces of the filler substance and the adhesive.

At step 209, an installation location may be selected. At step 210, a first structural element 10 may be positioned in the selected installation location; and at step 211, a plurality of subsequent structural elements 10 may be positioned in the selected installation location, such that the first structural element and the subsequent structural elements comprise the structural barrier 120.

The process of filing a silicone outer skin 14 with an aggregate and binding adhesive as detailed in method 200 is advantageous in that it produces solid-state structural elements 10 of substantially lighter weight than the solid-state structural elements 10 formed of the moldable, curable material such as concrete allowing for a larger variety of installation locations. Further, the mass or weight of the solid-state structural elements 10 formed in accordance with method 200 allow for a customizable mass or weight of the element 10, which may be adjusted or manipulated via the addition of the metallic-based particles detailed herein.

These advantages translate particularly well in the traffic management context in that these structural elements 10 are more easily transported and positioned in heavily trafficked and densely populated cities for traffic management, as pedestrian barriers, traffic barriers, crowd control device, or construction barriers. These advantages also translate particularly well in the water management or erosion control context, as solid-state structural elements 10 of concrete or the like are heavy enough that in marine applications, the same require difficult transport by barge, whereas solid-state structural elements 10 formed via the process 200 of filling a silicone skin 14 with an aggregate and binding adhesive may be formed as one of a jetty, a breakwater, or an erosion control apparatus positioned in shallow areas of a body of water, e.g., less than three to four feet of depth, that cannot be reached by barge. These solid-state structural elements 10 may also utilize adhesives having a relative short cure times, e.g., less than one hour. Accordingly, such elements 10 may be formed in the field, such as on barge or during vehicular transport and then positioned or installed in the desired installation location.

In water management and erosion control applications, the plurality of structural elements 120 may be positioned in the form of an elongated mound. The elongated mound may comprise a front sloping side wall facing seaward, a rear sloping side wall facing landward, and the plurality of structural elements 120 covering the seaward slope. Each structural element 10 of the plurality 120 is interlocked with at least one other structural element 10, the respective extension portions 20, 22, 24, 26 define void spaces therebetween. The void spaces cooperate to provide a substantial volume of void spaces between the plurality of structural elements 120, such that the void spaces are large enough to allow water to pass through the elongated mound, so that the plurality of structural elements 120 maintains a high degree of permeability to water and maintains stability under wave action and hydraulic roughness. As such, the volume of void spaces between the plurality of structural elements 120 is still small enough to allow trap sediment to collect under and within the plurality of structural elements 120 to mitigate erosion.

In the portable and collapsible structural element 10 example, the structural element 10 comprises an element body 12 defined by an outer skin 14. The outer skin 14 defines an interior void space 16. In this example, the outer skin 14 may be collapsible such that it is easily transported and then upon set-up or installed at a selected installation location, where the interior void space 16 may be filled with a filler substance on site.

In such an example, the element body 12 comprises the outer skin 14, which is comprised of a polyurea-based material or a similar material. The polyurea-based material may include a primer, a performance-based basecoat, and a polyurea-based topcoat. One commercially available example primer is the VersaFlex VF 20 primer; one commercially-available performance basecoat is the VersaFlex FSS 45DC, which is a one hundred percent solids, plural-component, aromatic-based polyurea elastomer system, which passes ASTM C 1305; and one commercially-available performance topcoat is an aliphatic polyurea system such as the VersaFlex GelFlex 1115 system, which is a plural-component, one hundred percent solids, aliphatic polyurea.

The outer skin 14 may define an inwardly facing surface 91 and an outwardly facing surface 93, and a thickness 95 defined from the inwardly facing surface 91 to the outwardly facing surface 93. The thickness is greater than about 0.125 inches.

The outer skin 14 may further comprise a plurality of outer skin portions 14A, 14B, 14C, 14D (FIGS. 16-17), wherein each of the outer skin portions 14A, 14B, 14C, 14D are substantially identical. Each of the outer skin portions 14A, 14B, 14C, 14D may have a thickness 95 of 0.125 inches or greater. Each of the outer skin portions 14A, 14B, 14C, 14D (FIG. 16) defines an outer periphery 41 and a plurality of connection edges 99 formed along the outer periphery 41 of the respective outer skin portion 14A, 14B, 14C, 14D. Connection edges 99 of each of the outer skin portions 14A, 14B, 14C, 14D are configured to be coupled to the connection edges 99 of at least one other outer skin portion 14A, 14B, 14C, 14D (FIG. 17), such that when the outer skin portions 14A, 14B, 14C, 14D are fixedly coupled to one another, the outer skin portions 14A, 14B, 14C, 14D collectively define each of the first extension portion 20, the second extension portion 22, the third extension portion 24, the fourth extension portion 26 of the portable and collapsible structural element 10 and an interior void space 16 therebetween.

The portable and collapsible structural element 10 may further include a reinforcing structure 54 (FIG. 9B). The reinforcing structure 54 may comprise a plurality of circumferential elements 80, 82, 84, 86 positioned in contact with the inwardly facing surface 91 of the outer skin 14 and about each of the extension portions 20, 22, 24, 26. As shown by example in FIG. 9B, the reinforcing structure 54 may further comprise a plurality of circumferential elements 80, 82, 84, 86 positioned about each of the extension portions 20, 22, 24, 26. Each circumferential element 80, 82, 84, 86 may be composed of a textile material, such as Nylon rope. Each circumferential element 80, 82, 84, 86 may also comprise a metallic, polymeric, or fiberglass element wrapped about or covered with a textile material.

More particularly, a first plurality of circumferential elements 80 may be disposed about the first extension portion 20 along the length 88a of the first extension portion 20. The first plurality of circumferential elements 80 may be distributed along the length 88a, for example, positioned evenly and equidistantly along the length 88a, of the first extension portion 20 between the interior center C and the first distal end 21. A second plurality of circumferential elements 82 may be disposed about the second extension portion 22 along the length 88b of the second extension portion 22. The second plurality of circumferential elements 82 may be distributed along the length 88b, for example, positioned evenly and equidistantly along the length 88b, of the second extension portion 22 between the interior center C and the second distal end 23. A third plurality of circumferential elements 84 may be disposed about the third extension portion 24 along the length 88c of the third extension portion 24. The third plurality of circumferential elements 84 may be distributed along the length 88c, for example, positioned evenly and equidistantly along the length 88c, of the third extension portion 24 between the interior center C and the third distal end 25. A fourth plurality of circumferential elements 86 may be disposed about the fourth extension portion 26 along the length 88d of the fourth extension portion 26. The fourth plurality of circumferential elements 86 may be distributed along the length 88d, for example, positioned evenly and equidistantly along the length 88d, of the fourth extension portion 26 between the interior center C and the fourth distal end 27.

The interior void space 16 defined by the outer skin 14 of the portable and collapsible structural element 10 may be filled or occupied by a filler substance when installed, such that the filler substance is disposed in the interior void space 16 and in contact with the inwardly facing surface 91 of the outer skin 14.

The filler substance is at least one of a fluid, an aggregate, or a soil. The filler substance may be a viscous fluid such a water; the filler substance may an aggregate material such as sand; the filler substance may be a concrete material; the filler substance may be a soil; or a combination of the foregoing. The type of filler substance may be selected based on the intended use of the structural element 10.

For example, if the structural element 10 is intended for use as an energy-absorbing traffic barrier 120, the filler material may be a viscous fluid or foam, if the structural element 10 is intended for use as an a ballistic defense barrier, the filler material may be a ballistic material, if the structural element 10 is intended for use as a construction or pedestrian barrier, the filler material may be a viscous fluid, a structural foam, an aggregate, concrete or another substance providing enough weight that the structural element 10 is not movable by a single person when in the employed or installed position. The filler substance may also comprise a mixture or layered plurality of different filler materials to provide the desired energy management properties. For example, in an energy absorbing traffic barrier 120 (FIGS. 20A-21), the filler substance may comprise a heavy aggregate, such as sand or the like within the respective extension portions 20, 22, 24, 26, of the first bisection 32, and a viscous fluid, such as water or the like, may comprise filler substance within the respective extension portions 20, 22, 24, 26, of the second bisection 30 to allow for strength in the first bisection 32 and energy absorption in the second bisection 30.

Once the filler substance is disposed within the interior void space 16 defined by the outer skin 14 the access point 92 may be sealed. In a re-usable example, wherein the filler substance may be drained from the interior void space 16 within the outer skin 14 after use and then transported away, the access point 92 may be sealed via, but not limited to, a cap, a removable adhesive, a tape, an elastic cover, or for example with a further application of a polyurea top coat. In a non-reusable example, the access point 92 may be sealed via, but not limited to, a cap, thermal bonding, a removable adhesive, a permanent adhesive, a tape, an elastic cover, or for example with a further application of a plug or a coating, such as a polyurea-based top coat.

Figure 22:
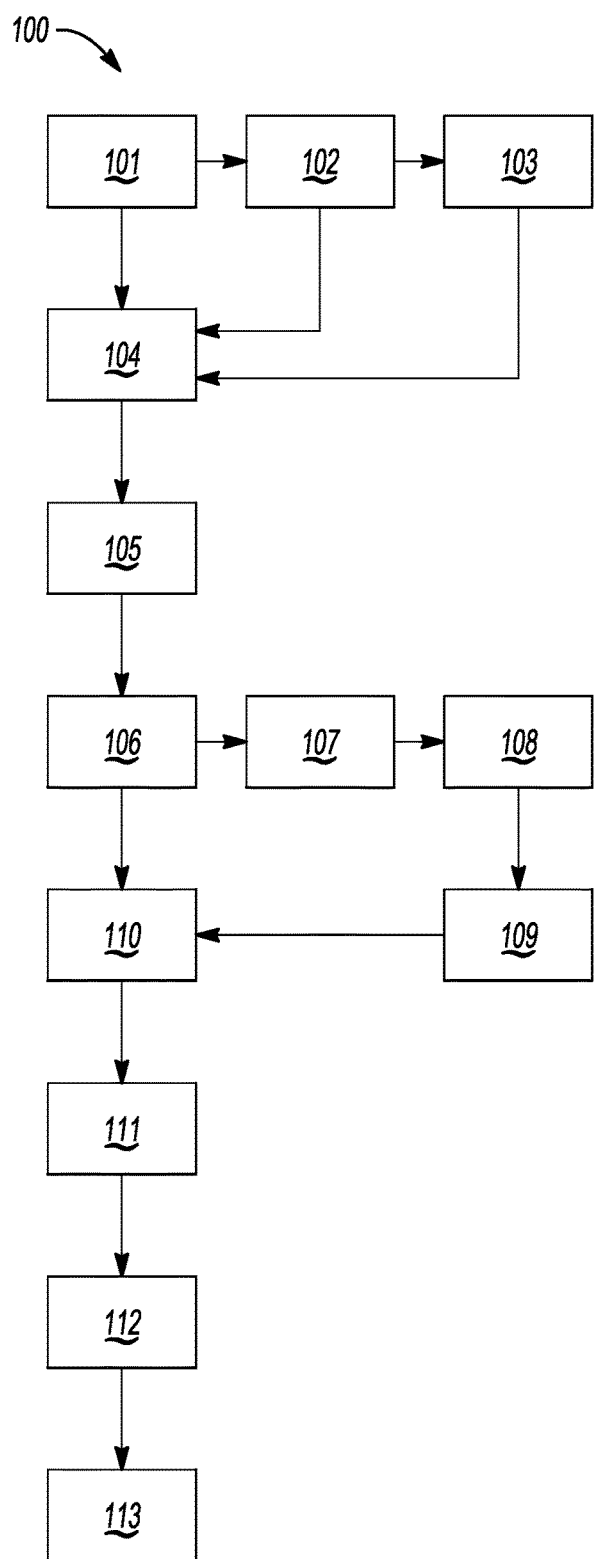
FIG. 22 is a flow diagram further detailing the method of installation for the structural barrier comprised of a first example structural element as detailed herein.

The portable and collapsible structural element 10 may be formed and installed via method 100 disclosed herein and detailed via the flow diagram in FIG. 22. In this way, the portable and collapsible structural element 10 may be formed using a negative form 56 (FIGS. 10, 12, 15). As such, at step 101 a negative form 56 is provided, wherein the negative form 56 comprises a form body 58, 60, 62, 64, the form body 58, 60, 62, 64 having an external form surface 96 and an interior center, the exterior form surface 96 being divided into a first portion 58, a second portion 60, a third portion 62, and a fourth portion 64. The negative form 56 may be formed of a fiberglass material or another suitable composite, reinforced, or polymer-based structural material and may comprise four mold portions 58, 60, 62, 64 that collectively make up the form body, namely, three upper mold portions 58, 60, 62 one lower mold portion 64. The negative mold 56 and collectively the four mold portions 58, 60, 62, 64 may further define the external mold surface 96.

Further, the negative form 56 mirrors the form of the structural element 10, in that the negative form 56 further defines a first extension portion 20 disposed on a first axis A1 and extending outwardly from the interior center in a first predetermined direction D1 to a first distal end 21, the first extension portion 20 defining a plurality of first extension portion flange members 98 that extend outwardly therefrom. A second extension portion 22 is disposed on a second axis A2 extending outwardly from the interior center in a second predetermined direction D2 to a second distal end 23, the second extension portion 22 defining a plurality of second extension portion flange members 98 that extend outwardly therefrom. A third extension portion 24 is disposed on a third axis A3 extending outwardly from the interior center in a third predetermined direction D3 to a third distal end 25, the third extension portion 24 defining a plurality of third extension portion flange members 98 that extend outwardly therefrom. A fourth extension portion 26 is disposed on a fourth axis A4 extending outwardly from the interior center in a fourth predetermined direction D4 to a fourth distal end 27, the fourth extension portion 26 defining a plurality of fourth extension portion flange members 98 that extend outwardly therefrom. Each of the first axis A1, the second axis A2, the third axis A3, and the fourth axis A4 defines an angle with each of the other axes at the interior center, and wherein the angle between each of the respective axes is substantially equivalent. In this way, the exterior mold surface 96 defines the interior void space 16 of the outer skin 14.

At step 102, optionally, the negative mold 56 may be covered with a mesh 70, as shown by example in FIG. 15, such that the mesh 70 is in contact with external mold surface 96. The mesh 70 may have varying cell size and configuration. The mesh is designed to allow the outer skin 14 material to be applied to the external mold surface 96 without adhering to the negative mold 56. In one example, the mesh 70 is a metallic or wire mesh. Other mesh materials may be used, including, for example, the mesh 70 can be a polymeric-based mesh, such as a molded or woven plastic mesh, a textile-based mesh such as a woven or knotted fabric or rope mesh, or the like.

At step 103, again optionally, in embodiments wherein the structural element 10 comprises a reinforcing structure 54, a reinforcing structure 54 for the outer skin 14 is disposed upon each of the first extension portion 20, the second extension portion 22, the third extension portion 24, and fourth extension portion 26 of the negative form 54 and in contact with the mesh 70. In such instances, the reinforcing structure 54 may further comprise a plurality of circumferential elements 80, 82, 84, 86 positioned in contact with the mesh 70 and the inwardly facing surface 91 of the outer skin 14 at each of the first portion 14A, the second portion 14B, the third portion 14C, and the fourth portion 14D of the outer skin 14. Further, as detailed hereinabove, each of the circumferential elements 80, 82, 84, 86 may comprise a textile element alone, a fiberglass element wrapped with the textile material, or the like.

At step 104, a polyurea-based material is applied to the external mold surface 96 of each of the first portion 58, the second portion 60, the third portion 62, and the fourth portion 64 of the negative form 56 until the polyurea-based material has a thickness 95 of greater than 0.125 inches on each of each of the first portion 58, the second portion 60, the third portion 62, and the fourth portion 64, such that the polyurea-based material forms the outer skin 14 of a structural element 10. In one example, the polyurea-based material is sprayed onto the external mold surface 96 of the negative mold 56.

More particularly, first a primer applied or sprayed on to the external mold surface 96 of the negative mold 56; one commercially available example primer is the VersaFlex VF 20 primer. Then, a performance-based polyurea basecoat is applied or sprayed over the primer; one commercially-available performance basecoat is the VersaFlex FSS 45DC, which is a one hundred percent solids, plural-component, aromatic-based polyurea elastomer system. This example elastomer system passes ASTM C 1305. Finally, a polyurea-based topcoat is then applied or sprayed on to the base coat; one commercially-available performance topcoat is an aliphatic polyurea system such as the VersaFlex GelFlex 1115 system, which is a plural-component, one hundred percent solids, aliphatic polyurea.

In some examples, the polyurea-based material may be sprayed onto the external mold surface 96 of each of the mold portions 58, 60, 62, 64, in sections, such that the polyurea-based material sprayed on the external mold surface 96 of the first upper mold portion 58 to form a first outer skin portion 14A, the polyurea-based material sprayed on the external mold surface of the second upper mold portion 60 to form a second outer skin portion 14B, the polyurea-based material sprayed on the external mold surface 96 of the third upper mold portion 62 to form a third outer skin portion 14C, and the polyurea-based material is sprayed on the external mold surface 96 of the lower mold portion 64 to form the fourth outer skin portion 14D. In this way, the polyurea-based material is sprayed onto the negative mold 94 such that the negative mold occupies the interior void space 16 of the structural element 10 while the polyurea-based material cures or dries.

As such, at step 105, a curing or drying process for the polyurea-based material of the outer skin 14 is initiated. Upon completion of the curing or drying process for the polyurea-based material, at step 106, each of the first portion 14A, the second portion 14B, the third portion 14C, and the fourth portion 14D of the outer skin 14 are removed from the negative form 56.

The lightweight and collapsible nature of the outer skin 14 of the portable and collapsible structural element 10 allows for ease of transport, shipping, and installation. As such, optionally, at step 107, each of the first portion 14A, the second portion 14B, the third portion 14C, and the fourth portion 14D of the outer skin and the integral reinforcement structure 54 may be packaged for shipping to a desired installation location along with a coupling feature such as an adhesive, resin binder, epoxy, or another suitable coupling material sufficient in strength to fixedly attach each of the first portion 14A, the second portion 14B, the third portion 14C, and the fourth portion 14D of the outer skin upon set-up and installation. Said another way, the polyurea-based outer skin 14 along with the reinforcing structure 54 is fully portable and collapsible such that, the structural element 10 may exist in one of a collapsed transport condition and an employed or installed condition. Once the outer skin 14 is cured and fully formed, the respective portions 14A, 14B, 14C, 14D of the outer skin may be removed from the negative mold 56 and packaged along with the reinforcement structure 54 and a coupling feature and transported or shipped in a condensed configuration, namely in the collapsed transport condition. More particularly, the first portion 14A, the second portion 14B, the third portion 14C, and the fourth portion 14D of the outer skin, the integral reinforcing structure 54, and the coupling feature may be packaged together in a shippable and easily transportable structural element kit and at step 108, shipped or transported to a destination anywhere in the world for set-up, installation, and use.

Upon arrival at the destination, at step 109, each of the first portion 14A, the second portion 14B, the third portion 14C, and the fourth portion 14D of the outer skin and the integral reinforcement structure 54 and the coupling feature may be removed from the structural element kit.

At step 110, the end user or installation crew shall select an installation location and orientation for each of the respective structural elements 10, such that the plurality of structural elements 120 forms an elongated mound to serve in various applications, such as a jetty, a breakwater, a pedestrian barrier, a vehicular barrier, an anti-tank obstacle, a ballistic barrier, a construction barrier, an eco-barrier for erosion control, or another form of traversal impediment. Said another way, at step 110, each of the first portion 14A, the second portion 14B, the third portion 14C, and the fourth portion 14d of the outer skin of a first structural element 10 is positioned in the selected installation location, and then each of the first portion 14A, the second portion 14B, the third portion 14C, and the fourth portion 14d of the outer skin of each subsequent structural element 10 is positioned in the selected installation location.

Once the installation location and orientation for each of the structural elements 10 is selected, the respective the first portion 14A, the second portion 14B, the third portion 14C, and the fourth portion 14D of the outer skin and the integral reinforcement structure 54 may be positioned in the field and transformed from the collapsed transport condition and an employed or installed condition. In this way, at step 111, the connection edges 99 formed along the outer periphery 41 (FIGS. 16-17) of each of the first portion 14A, the second portion 14B, the third portion 14C, and the fourth portion 14D of the outer skin of a respective structural element 10 to the connection edges 99 formed along the outer periphery 41 of at least one of the other respective portions 14A, 14B, 14C, 14D of the outer skin of the same respective structural element 10 with the connection feature, e.g, adhesive, resin binder, epoxy, or the like. The respective portions 14A, 14B, 14C, 14D of the outer skin may be glued together or coupled with an epoxy or adhesive at the connection edges 99. In one example, the respective portions 14A, 14B, 14C, 14D of the outer skin may be fastened together or coupled using mechanical fasteners, such as fastening strips, plastic rivets, etc.

At step 112, a curing or drying process for the adhesive, epoxy, or resin binder is initiated. Additionally, the respective portions 14A, 14B, 14C, 14D of the outer skin may be coupled with an epoxy or adhesive binder and further secured with clamps until the epoxy or adhesive binder is fully dried or cured.

Once the respective portions 14A, 14B, 14C, 14D of the outer skin 14 are secured to one another, at step 113, the interior void space 16 defined by the outer skin may be filled with a filler substance. Upon filling the structural element 10 with the filler substance the structural element 10 transitions to occupy the employed or installed condition. As shown by example in FIG. 17, the outer skin 14 may be filled with filler substance via the access point 92. In a re-usable example, wherein the filler substance may be drained from the interior void space 16 within the outer skin 14 after use and then transported away, the access point 92 may be sealed via, but not limited to, a cap, a removable adhesive, a tape, an elastic cover, or for example with a further application of a polyurea top coat. In a non-reusable example, the access point 92 may be sealed via, but not limited to, a cap, thermal bonding, a removable adhesive, a permanent adhesive, a tape, an elastic cover, or for example with a further application of a polyurea top coat.

The filler substance may include, at least one of a fluid, an aggregate, or a soil. The filler substance may be a viscous fluid such as water; the filler substance may be an aggregate material such as sand; the filler substance may be a concrete material; the filler substance may be a ballistic or ballistic slag material, or the filler substance may be a soil. The type of filler substance may be selected based on the intended use of the structural element 10. For example, if the structural element 10 is intended for use as an energy-absorbing traffic barrier 120, the filler material may be a viscous fluid or a combination of an aggregate and viscous fluid, if the structural element 10 is intended for use as a ballistic defense barrier, the filler material may be a ballistic material, if the structural element 10 is intended for use as a construction or pedestrian barrier, the filler material may be a viscous fluid, an aggregate, concrete or another substance providing enough weight that the structural element 10 is not movable by a single person when in the employed position. The filler substance may also comprise a mixture or layered plurality of different filler materials to provide the desired energy management properties. For example, in an energy absorbing traffic barrier 120 (FIGS. 20A-21), the filler substance may comprise a heavy aggregate, such as sand or the like within the respective extension portions 20, 22, 24, 26, of the first bisection 32, and a viscous fluid, such as water or the like, may comprise filler substance within the respective extension portions 20, 22, 24, 26, of the second bisection 30 to allow for strength in the first bisection 32 and energy absorption in the second bisection 30. The examples are illustrative, such that the use of other energy absorbing materials, such as foam, foam composites, polymeric materials, etc., are anticipated within the scope of the disclosure.

In addition to the structural applicability of the portable and collapsible structural elements 10 as a traffic barrier, in a water management or erosion control context, the portable and collapsible structural barriers 10 comprising an outer skin 14, provide significant improvements over existing solid-state barriers that require difficult transport by barge. In one such instance, the plurality of portable and collapsible structural barriers 120 may be formed as one of a jetty, a breakwater, or an erosion control apparatus positioned in shallow areas of a body of water. In this way, the portions of the outer skin 14A, 14B, 14C, and 14D may be coupled and assembled on land and then positioned in shallow portions of a body of water, e.g., less than three to four feet of depth, that cannot be reached by barge, and then filled with filler material on site after being placed in the body of water.

In such applications, the plurality of structural elements 100 may be positioned in the form of an elongated mound 120. The elongated mound 120 may comprise a front sloping side wall facing seaward, a rear sloping side wall facing landward, and the plurality of structural elements 120 covering the seaward slope. Each structural element 10 of the plurality 120 is interlocked with at least one other structural element 10, the respective extension portions 20, 22, 24, 26 define void spaces therebetween. The void spaces cooperate to provide a substantial volume of void spaces between the plurality of structural elements 120, such that the void spaces are large enough to allow water to pass through the elongated mound 120, so that the plurality of structural elements 120 maintains a high degree of permeability to water and maintains stability under wave action and hydraulic roughness. As such, the volume of void spaces between the plurality of structural elements 120 is still small enough to allow trap sediment to collect under and within the plurality of structural elements 120 to mitigate erosion.

As detailed herein, the structural element 10 may be a solid-state structural element 10 comprised of a predetermined moldable, formable, and/or curable material, for example, a concrete material, a ballistic material, or the like, a solid-state structural element 10 comprised of a plurality of aggregate pieces bonded by an adhesive, or the structural element 10 may be the collapsible and portable formation, standing alone or in a plurality thereof 120 may be used in various applications, such as a jetty, a breakwater, a pedestrian barrier, a vehicular barrier, an anti-tank obstacle, a ballistic barrier, a construction barrier, an echo or acoustic barrier, or another form of traversal impediment or energy absorbing device.

As shown by example in FIGS. 18-21, the plurality of structural elements 120 may comprise a series of structural elements 10, wherein the structural elements 10 are randomly organized and stacked, such that the respective extension portions 20, 22, 24, 26 of the structural elements 10 are interlocked with one another. The respective extension portions 20, 22, 24, 26 of each of the structural elements 10 are configured to receive and interlock with the extension portions 20, 22, 24, 26 of each of the other structural elements 10 of the plurality of structural elements 120. The plurality of structural elements 100 may be organized in an elongated mound configuration having a first side 118 and a second side 119.

Figure 18:
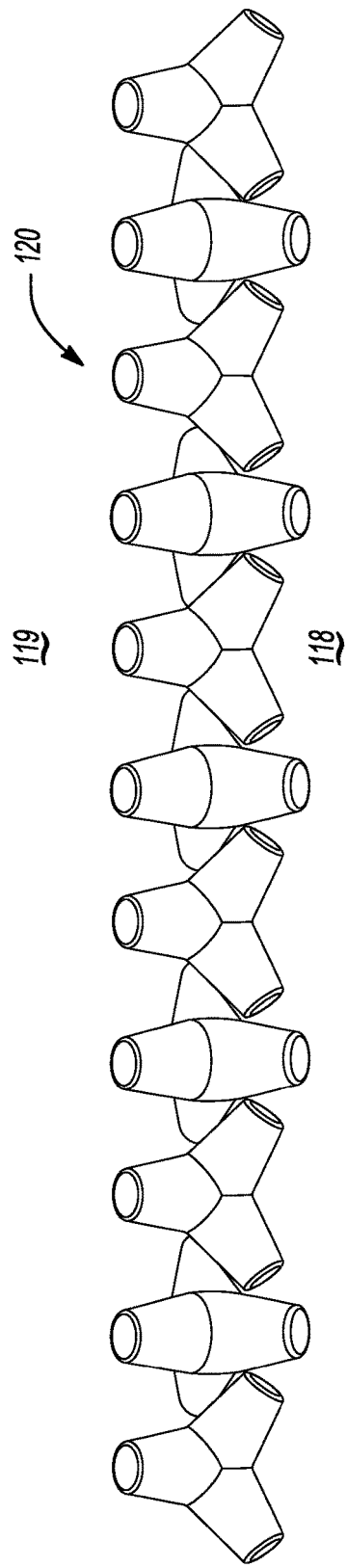
FIG. 18 is an example grouping of structural elements, appearing as tetrapods, positioned in an elongated and substantially linear formation as barrier.
Figure 19:
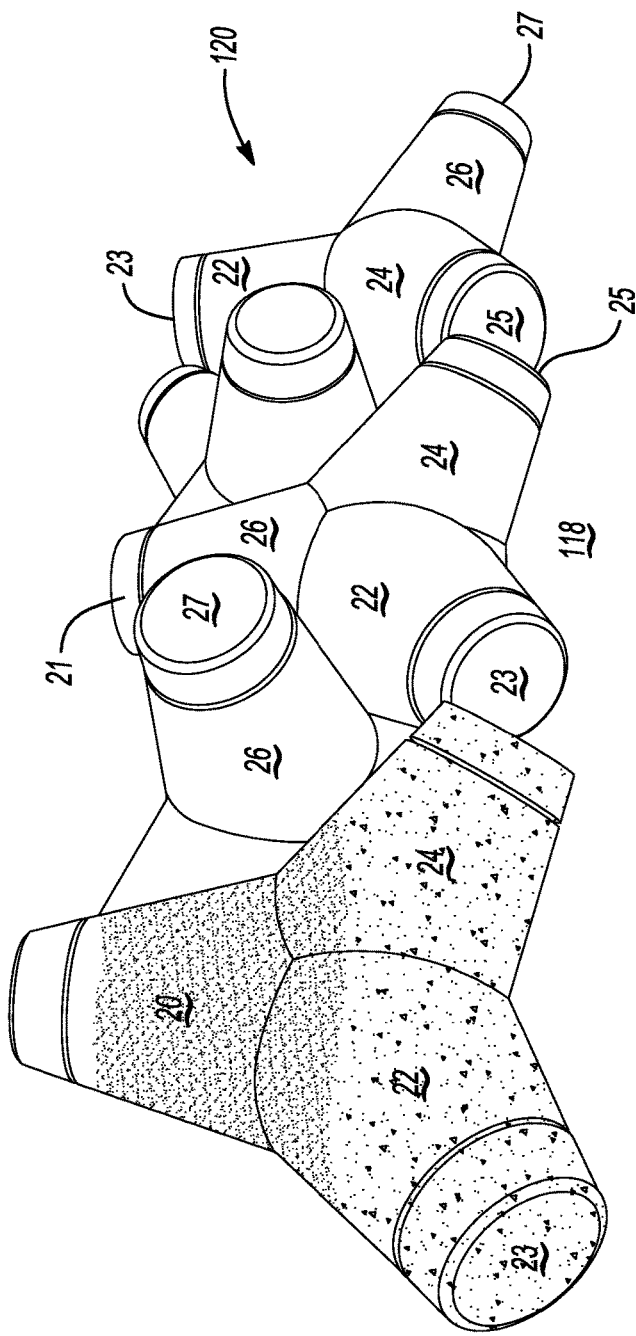
FIG. 19 is an example grouping of structural elements, appearing as tetrapods, positioned in an elongated and substantially linear configuration and interlocked with one another to form a as barrier.
Figure 20A:
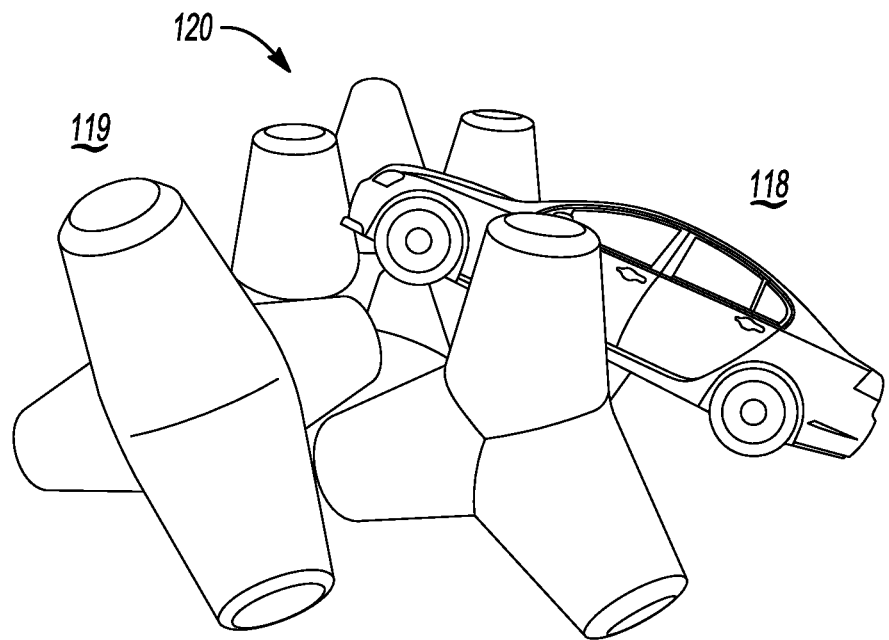
FIG. 20A is another example grouping of structural elements, appearing as tetrapods and employed as part of the traffic barrier detailed herein and showing a vehicle interacting with the traffic barrier.
Figure 20B:
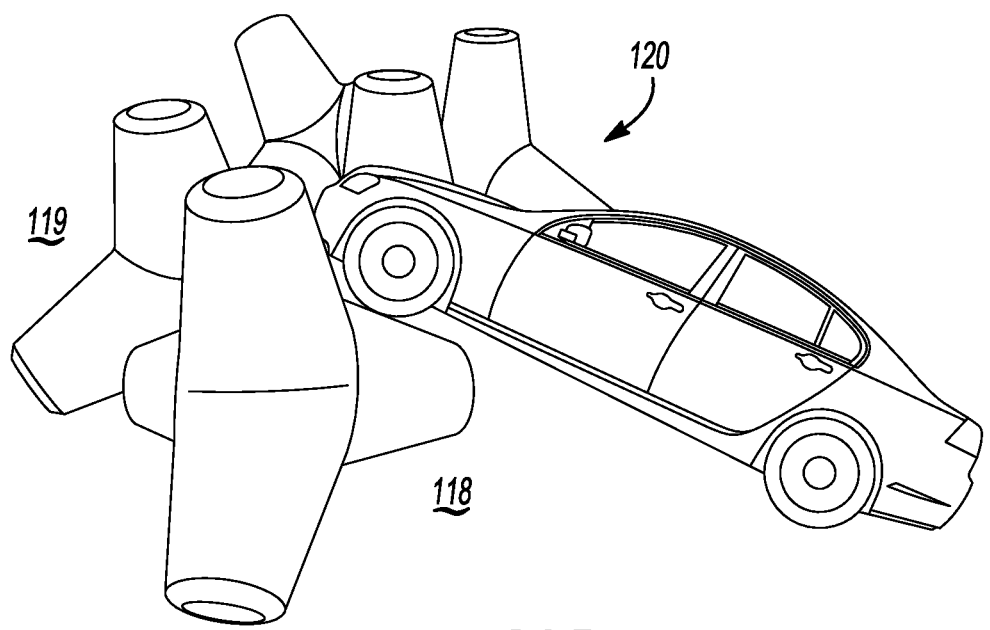
FIG. 20B is another example grouping of structural elements, appearing as tetrapods and employed as part of the traffic barrier detailed herein and showing a vehicle interacting with the traffic barrier.
Figure 20C:
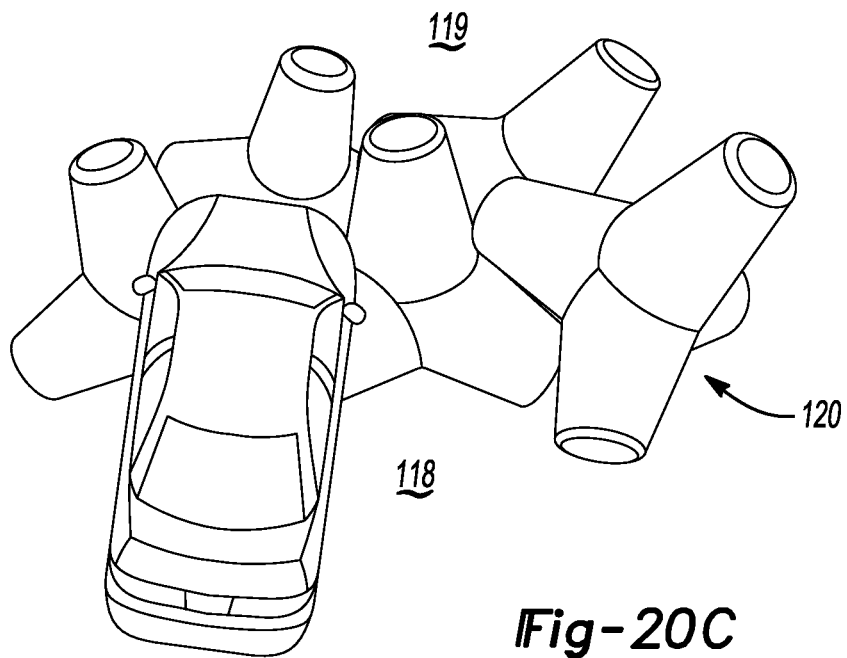
FIG. 20C is another example grouping of structural elements, appearing as tetrapods and employed as part of the traffic barrier detailed herein and showing a vehicle interacting with the traffic barrier.
Figure 20D:
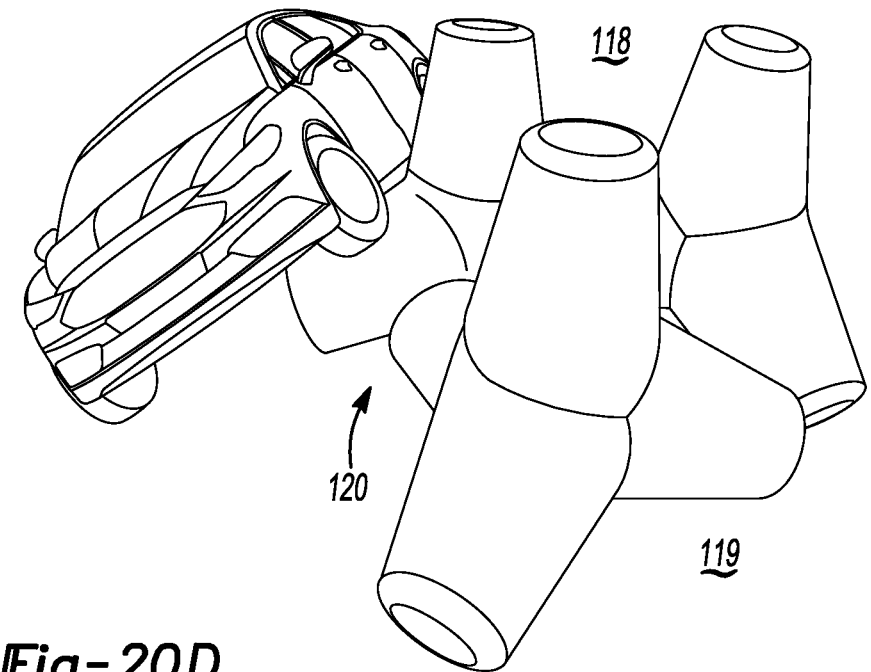
FIG. 20D is another example grouping of structural elements, appearing as tetrapods and employed as part of the traffic barrier detailed herein and showing a vehicle interacting with the traffic barrier.
Figure 20E:
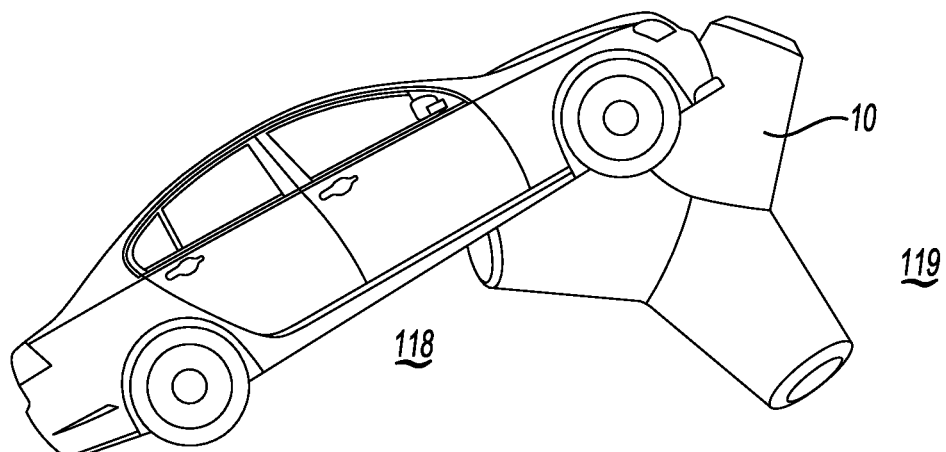
FIG. 20E is an example structural element, appearing as a tetrapod and employed as a traffic barrier detailed herein and showing a vehicle interacting with the structural element.
Figure 21:
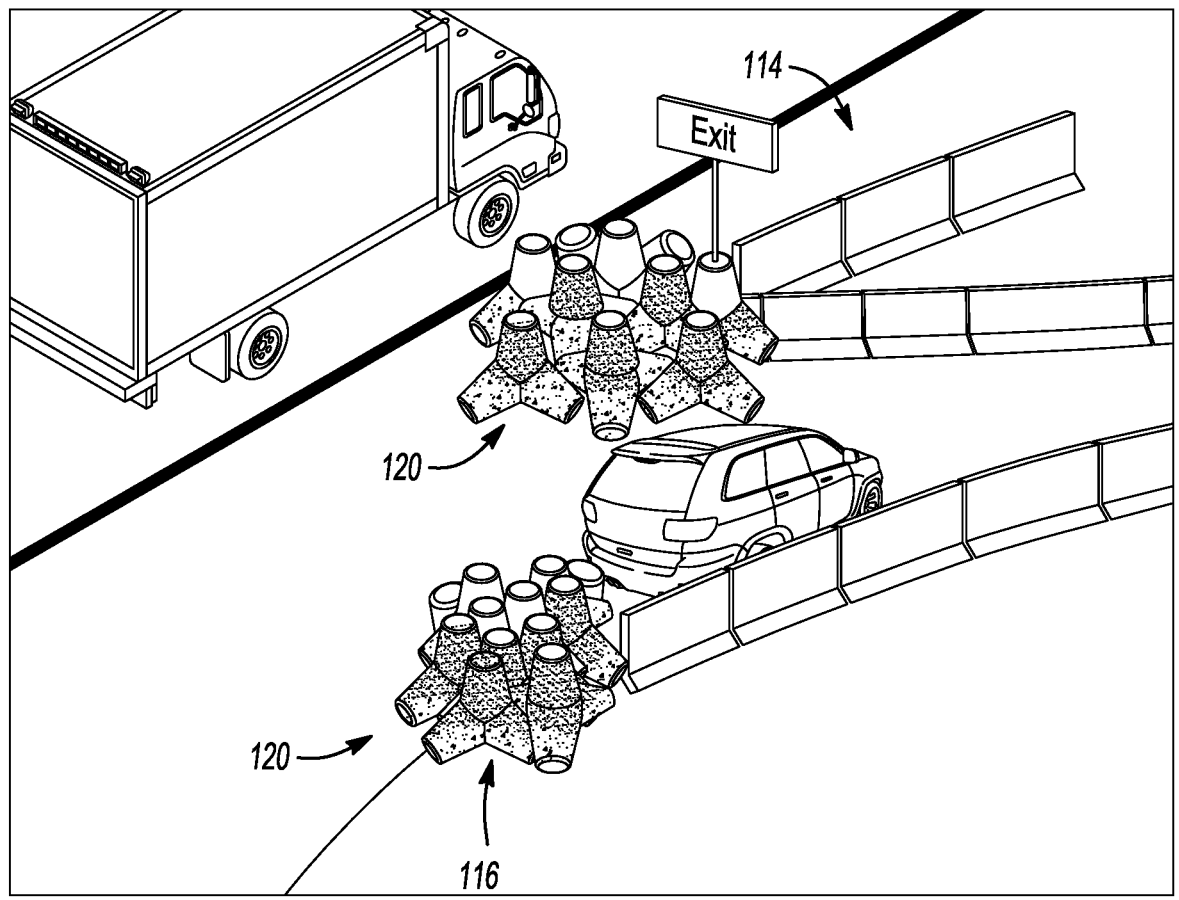
FIG. 21. is an example grouping of structural element, appearing as a tetrapods, and employed as part of the traffic barrier detailed herein.

As shown by example in FIGS. 20A-21, wherein the plurality of structural elements 120 comprises a traffic barrier, namely, one of a pedestrian barrier, crowd control device, a vehicular barrier, a construction barrier, defensive barrier, anti-tank obstacle, or other traversal impediment, the plurality of the structural elements 120 may be positioned in an elongated and substantially linear configuration as shown in FIGS. 18, 19, and 20C, or for example, in a curvilinear configuration. Alternatively, the structural elements 120 may be positioned in a non-linear or randomized grouping, for example, stacked and intermingled as shown by example in FIGS. 20A-20B, 20D, and 21. For example, an elongated mound of structural elements 10 may be configured to prevent the passage of a pedestrian from a first side 118 to a second side 119. In another example, the elongated mound 120 may be configured to prevent the passage of a vehicle, such as a tank or an automobile, from the first side 118 to the second side 119. In an example, wherein the structural elements 10 are formed of a ballistic material, the elongated mound 120 may be configured to prevent the passage of a ballistic projectile, from the first side 118 to the second side 119.

In any configuration of the plurality 120, as shown by example in FIGS. 20A-20D, the plurality of structural elements 120 may be stacked or intermingled such that the respective extension portions 20, 22, 24, 26 of each of the structural elements 10 are configured to receive and interlock with the extension portions 20, 22, 24, 26 of each of the other structural elements 10 of the plurality of structural elements 120. In such an example, each structural element 10 is interlocked with at least one other structural element 10.

In a pedestrian barrier or construction barrier embodiment, wherein the structural elements 10 are positioned in an elongated and substantially linear plurality 120, such that the plurality of structural elements 120 is configured to prevent the passage of a pedestrian from a first side 118 to a second side 119 of the plurality of structural elements 120. In such examples, the structural elements 10 may be configured to serve as bases for signage and signals (FIG. 21) indicating road or sidewalk closures or other restricted areas. In the construction barrier, pedestrian barrier, or crowd control device application, the filler material may be one of concrete, aggregate such as sand, a viscous fluid such as water, or a ballistic material.

Referring to FIGS. 18-21, the structural element 10 and a plurality 120 thereof has industrial applicability as a vehicle barrier. As shown in FIG. 18, the plurality of the structural elements 10 may be positioned in an elongated and substantially linear configuration, e.g., and elongated mound 120, or stacked or intermingled as shown in FIG. 19, such that the respective extension portions 20, 22, 24, 26 of each of the structural elements 10 are configured to receive and interlock with the extension portions 20, 22, 24, 26 of each of the other structural elements 10 of the plurality of structural elements 120. In a vehicular barrier application, the structural elements 10 are configured to prevent, impede, or slow the passage of a vehicle from the first side 118 to the second side 119 of the plurality of structural elements 120. In one example application, as shown in FIGS. 20A-21, the vehicle barrier 120 may be configured to slow the vehicle and/or absorb energy from the vehicle while mitigating damage to the vehicle, for example, as an exit ramp or road median energy absorption system (FIG. 21).

The geometry of the structural elements 10 as defined herein allows for four potential outcomes upon a vehicle making contact with the structural elements 10, namely, the plurality of structural elements 120 may trap, cradle, or safely decelerate the vehicle (FIGS. 20A-20C), tilt the vehicle (FIG. 20D), or impinge the underside of the vehicle (FIGS. 20A and 20E) depending on the angle of contact. Referring back to FIGS. 1-8B and FIG. 20E, the geometry of the structural element 10 may define the type of outcome upon a vehicle making contact with the structural elements 10. For example, the first cross-sectional diameter 48 may be designed such that a vehicle cannot climb over (FIG. 20E)

the respective extension portion 20, 22, 24, 26. In such instances, the vehicle may be stopped in a direction substantially orthogonal to its direction of motion or inertia. In such examples, the angle 53 is smaller, as the difference between the first cross-section diameter 48 and the interior base cross-sectional diameter 51 is smaller or less pronounced.

Alternatively, the first cross-sectional diameter 48 may be designed such that a vehicle may climb over (FIG. 20E) the respective extension portion 20, 22, 24, 26, e.g., at bumper height, to induce an impingement outcome (FIG. 20A, 20E) or a tilt outcome (FIG. 20D). In such examples the angle 53 is greater, as the difference between the first cross-section diameter 48 and the interior base cross section diameter 51 is greater or more pronounced. In an impingement outcome, if contact is made at the precise angle of entry, the structural element 10 may high center the vehicle thereby impinging the underside of the vehicle and immobilizing the same (20E). In an impingement scenario, the example structural element 10 shown in FIGS. 5-9A may be particularly useful in that its pointed polygonal edges may be most effective in an impingement scenario to decelerate and immobilize the vehicle.

Additionally, the overall height 17 of the structural element 10 may be designed to prevent movement from one resting position 34, 36, 38, 40 to another resting position 34, 36, 38, 40 so that a vehicle cannot climb over the respective extension portion 20, 22, 24, 26. In such instances, the extension portion 20, 22, 24, 26 within the second bisection 30 may have a length 88a, 88b, 88c, 88d that is substantially shorter than the lengths of each of the extension portions 20, 22, 24, 26 within the first bisection 32, such that the vehicle may be stopped in a direction substantially orthogonal to its direction of motion or inertia.

Alternatively, the overall height 17 of the structural element 10 may be designed to facilitate movement from one resting position 34, 36, 38, 40 to another resting position 34, 36, 38, 40 when the structural element 10 is contacted. In such examples, the extension portion 20, 22, 24, 26 within the second bisection 30 may have a length 88a, 88b, 88c, 88d that is substantially longer than the lengths of each of the extension portions 20, 22, 24, 26 within the first bisection 32, to facilitate toppling of the structural element 10 and induce an impingement outcome on the vehicle, if contact is made at the precise angle of entry, to high center the vehicle (20E) thereby impinging the underside of the vehicle and immobilizing the same.

In the vehicle barrier application, the filler material may be one of concrete, aggregate such as sand or the like, a viscous fluid such as water or the like, or a ballistic material, or another substance providing enough weight that the structural element 10 is not movable by a single person when in the employed position. The filler substance may also comprise a mixture or layered plurality of different filler materials to provide the desired energy management properties (FIGS. 19 and 21). For example, in an energy absorbing traffic barrier (FIG. 21), the filler substance may comprise a heavy aggregate, such as sand or the like within the respective extension portions 20, 22, 24, 26, of the first bisection 32, and a viscous fluid, such as water or the like, may comprise filler substance within the respective extension portions 20, 22, 24, 26, of the second bisection 30 to allow for strength in the first bisection 32 and energy absorption in the second bisection 30.

In examples wherein a concrete or aggregate material is utilized as the filler material, the plurality of structural elements 120 may be configured as a vehicle barrier or impediment. As shown by example in FIGS. 20A-20D, the plurality of structural elements 120 may be stacked or intermingled such that the respective extension portions 20, 22, 24, 26 of each of the structural elements 10 are configured to receive and interlock with the extension portions 20, 22, 24, 26 of each of the other structural elements 10 of the plurality of structural elements 120. In an example such as those shown in FIGS. 19 and 20A-20E the structural elements 10, when interlocked maintain the ability to tumble from one resting position 34, 36, 38, 40 to another resting position 34, 36, 38, 40 while intermingled, upon receiving a force, such as when absorbing energy from and decelerating a vehicle, such as an automobile.

In examples wherein a viscous fluid is utilized as the filler material, the plurality of structural elements 120 may be configured as a vehicle barrier or energy absorbing structure. As shown by example in FIGS. 20A-20D, the plurality of structural elements 120 may be stacked or intermingled such that the respective extension portions 20, 22, 24, 26 of each of the structural elements 10 are configured to receive and interlock with the extension portions 20, 22, 24, 26 of each of the other structural elements 10 of the plurality of structural elements 120. In an example such as those shown in FIGS. 19 and 20A-20E, the structural elements 10, when interlocked maintain the ability to tumble from one resting position 34, 36, 38, 40 to another resting position 34, 36, 38, 40 while intermingled, upon receiving a force, such as when absorbing energy from and decelerating a vehicle, such as an automobile.

Further, in a roadway, vehicular, construction, or crowd control context, the collapsibility and portability of the portable and collapsible subject structural barriers 10 comprising an outer skin 14, provides significant improvements over existing solid-state barriers that are extremely heavy and difficult to transport, place, and position. In one particular application, the plurality of structural elements 120 may be configured as an energy absorbing device at the entrance to a low-speed highway off ramp 114, such as a clover leaf style off ramp (FIG. 21), on the open end portion 116 of a highway barrier (FIG. 21), as a median divider between opposing traffic lanes, or on other various potentially-hazardous road markings, obstacles, or encumbrances. Utilizing a viscous fluid or foam as a filler material or a viscous fluid, foam and/or aggregate combination of filler materials, allows the structural elements 10 to roll, tumble and interlock with one another upon contact and move from one resting position 34, 36, 38, 40 to another. This ability to tumble and interlock provides improvements over the existing applications for these purposes having a viscous fluid filler material, in that the structural elements described herein will tumble and interlock rather than burst. Further, the viscous fluid filler material is more elastic and permeable than a concrete or aggregate, which allows the plurality of structural elements 120 to absorb the energy from and safely decelerate the subject vehicle before ultimately trapping, cradling, or safely, tilting, or impinging the vehicle upon rest.

In examples wherein, a ballistic material is utilized as the filler material, the plurality of structural elements 120 may be configured as an anti-tank obstacle or other ballistics impediment, and may be positioned in an elongated and substantially linear configuration (FIG. 18) or stacked or intermingled as shown in (FIG. 19). In this way, the ballistic resistance of the filler material may protect against the passage of projectiles from the first side 118 to the second side 119. Further, the geometry of the structural elements 10 as detailed herein allows the structural elements 10, namely, the plurality of structural elements 120 to trap the oncoming tank (FIG. 20A-20C), tilt the oncoming tank (FIG. 20D), or impinge the underside of the oncoming tank (FIGS. 20A and 20E) depending on the angle of contact. In any case, the plurality of structural elements 120 shall prevent the oncoming tank from passing from the first side 118 to the second side 119 thereof.

The examples described herein are non-limiting, and it would be understood that the structural elements 10 can be arranged into a plurality of structural elements 120 to define a structural barrier 120 having a shape or size other than the examples shown in the Figures. For example, a plurality of structural elements 120 may be arranged to at least partially surround another structure or object to be protected or barricaded, where the protected object may be, for example, a building, statue, designated area of land or portion of roadway, or a transient object moving proximate to the structural barrier 120, such as a motorcade, parade, group of persons, or the like. For example, a plurality of structural elements 120 may be fastened to each other, via chain, rope or other means, to prevent or impede separation of one of the structural elements 10 from another when subjected to loading, for example, from a colliding force or ballistic force.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A structural element comprising:
an element body having an exterior surface and an interior center, the element body further comprising:
a first extension portion disposed on a first axis and extending outwardly from the interior center in a first predetermined direction to a first distal end;
a second extension portion disposed on a second axis extending outwardly from the interior center in a second predetermined direction to a second distal end;
a third extension portion disposed on a third axis extending outwardly from the interior center in a third predetermined direction to a third distal end;
a fourth extension portion disposed on a fourth axis extending outwardly from the interior center in a fourth predetermined direction to a fourth distal end;
wherein each of the first axis, the second axis, the third axis, and the fourth axis define a plurality of axes, such that each of the first axis, the second axis, the third axis, and the fourth axis defines an angle with each of the other axes at the interior center, and wherein the angle between each of the respective axes is substantially equivalent; and
wherein the element body is formed of a concrete material positioned about a reinforcement structure, wherein the reinforcement structure comprises:
a plurality of flange elements, the plurality of flange elements comprising:
a first plurality of flange elements disposed on the first axis and extending outwardly from the interior center toward the first distal end;
a second plurality of flange elements disposed on the second axis and extending outwardly from the interior center toward the second distal end;
a third plurality of flange elements disposed on the third axis and extending outwardly from the interior center toward the third distal end; and
a fourth plurality of flange elements disposed on the fourth axis and extending outwardly from the interior center toward the fourth distal end.

2. The structural element of claim 1 wherein the element body comprises a first bisection and a second bisection, such that the first bisection includes three of the extension portions, wherein the respective distal ends thereof are positioned on a plane; and
wherein the second bisection includes the other one of the extension portions, such that the respective extension portion and the respective axis extend outwardly from the interior center to the respective distal end orthogonally to the plane.

3. The structural element of claim 2 wherein the structural element maintains an identical orientation in each of a first resting position, a second resting position, a third resting position, and a fourth resting position;
wherein when the structural element occupies the first resting position, the first bisection includes each of the second extension portion, the third extension portion, and the fourth extension portion, such that the second distal end, the third distal end, and the fourth distal end are positioned on the plane, and wherein the second bisection includes the first extension portion, such that the first extension portion and the first axis extend outwardly from the interior center to the first distal end orthogonal to the plane;
wherein when the structural element occupies the second resting position, the first bisection includes each of the first extension portion, the third extension portion, and the fourth extension portion, such that the first distal end, the third distal end, and the fourth distal end are positioned on the plane, and wherein the second bisection includes the second extension portion, such that the second extension portion and the second axis extend outwardly from the interior center to the second distal end orthogonal to the plane;
wherein when the structural element occupies the third resting position, the first bisection includes each of the first extension portion, the second extension portion, and the fourth extension portion, such that the first distal end, the second distal end, and the fourth distal end are positioned on the plane, and wherein the second bisection includes the third extension portion, such that the third extension portion and the third axis extend outwardly from the interior center to the third distal end orthogonal to the plane; and
wherein when the structural element occupies the fourth resting position, the first bisection includes each of the first extension portion, the second extension portion, and the third extension portion, such that the first distal end, the second distal end, and the third distal end are positioned on the plane, and wherein the second bisection includes the fourth extension portion, such that the fourth extension portion and the fourth axis extend outwardly from the interior center to the fourth distal end orthogonal to the plane.

4. The structural element of claim 3 wherein:
the first extension portion defines a first extension portion intermediate point, the second extension portion defines a second extension portion intermediate point, the third extension portion defines a third extension portion intermediate point, and the fourth extension portion defines a fourth extension portion intermediate point;

the first extension portion defines a first cross sectional diameter at the first extension portion intermediate point and a second cross sectional diameter at the first distal end, wherein the first cross sectional diameter is greater than the second cross sectional diameter;

the second extension portion defines a first cross sectional diameter at the second extension portion intermediate point and a second cross sectional diameter at the second distal end, wherein the first cross sectional diameter is greater than the second cross sectional diameter;

the third extension portion defines a first cross sectional diameter at the third extension portion intermediate point and a second cross sectional diameter at the third distal end, wherein the first cross sectional diameter is greater than the second cross sectional diameter; and the fourth extension portion defines a first cross sectional diameter at the fourth extension portion intermediate point and a second cross sectional diameter at the fourth distal end, wherein the first cross sectional diameter is greater than the second cross sectional diameter.

5. The structural element of claim 1, further comprising:
a plurality of circumferential elements coupled to the plurality of flange elements, wherein:
  a first plurality of circumferential elements is coupled to the first plurality of flange elements along a length of the first extension portion, and wherein the first plurality of circumferential elements are distributed along the length of the first extension portion between the interior center and the first distal end;
  a second plurality of circumferential elements is coupled to the second plurality of flange elements along a length of the second extension portion, and wherein the second plurality of circumferential elements are distributed along the length of the second extension portion between the interior center and the second distal end;
  a third plurality of circumferential elements is coupled to the third plurality of flange elements along a length of the third extension portion, and wherein the third plurality of circumferential elements are distributed along the length of the third extension portion between the interior center and the third distal end; and
  a fourth plurality of circumferential elements is coupled to the fourth plurality of flange elements along a length of the fourth extension portion, and wherein the fourth plurality of circumferential elements are distributed along the length of the fourth extension portion between the interior center and the fourth distal end.

6. The structural element of claim 1 wherein each of the first extension portion, the second extension portion, third extension portion, and the fourth extension portion is formed as a plurality of truncated cones, the plurality of truncated cones including:
  a first truncated cone extending from the interior center to the respective extension portion intermediate point; and
  a second truncated cone extending from the respective extension portion intermediate point to the respective distal end, wherein the respective distal end defines a flattened and circular cross-sectional configuration.

7. The structural element of claim 1 wherein each of the first extension portion, the second extension portion, the third extension portion, and the fourth extension portion of the structural element is formed as a plurality of polygonal prisms, the plurality of polygonal prisms including:
  a first polygonal prism extending from the interior center to the respective extension portion intermediate point; and
  a second polygonal prism extending from the respective extension portion intermediate point to the respective distal end, wherein the respective extension portion intermediate point and the respective distal end defines a polygonal cross-sectional configuration.

8. The structural element of claim 7, wherein each of the polygonal prisms is at least one of a pentagonal prism, a hexagonal prism, or an octagonal prism.

9. The structural element of claim 1 wherein the element body further comprises an outer skin;
  wherein the outer skin defines an inwardly facing surface and an outwardly facing surface disposed opposite the inwardly facing surface and a thickness defined between the inwardly facing surface and the outwardly facing surface, wherein the thickness is greater than 0.125 inches; and
  wherein the outer skin further defines the first extension portion, the second extension portion, the third extension portion, the fourth extension portion, and an interior void space.

10. A structural element comprising:
an element body having an exterior surface and an interior center, the element body further comprising:
  a first extension portion disposed on a first axis and extending outwardly from the interior center in a first predetermined direction to a first distal end;
  a second extension portion disposed on a second axis extending outwardly from the interior center in a second predetermined direction to a second distal end;
  a third extension portion disposed on a third axis extending outwardly from the interior center in a third predetermined direction to a third distal end;
  a fourth extension portion disposed on a fourth axis extending outwardly from the interior center in a fourth predetermined direction to a fourth distal end;
  wherein each of the first axis, the second axis, the third axis, and the fourth axis define a plurality of axes, such that each of the first axis, the second axis, the third axis, and the fourth axis defines an angle with each of the other axes at the interior center, and wherein the angle between each of the respective axes is substantially equivalent; and
  wherein the element body further comprises an outer skin;
  wherein the outer skin defines an inwardly facing surface and an outwardly facing surface disposed opposite the inwardly facing surface and a thickness defined between the inwardly facing surface and the outwardly facing surface, wherein the thickness is greater than 0.125 inches; and
  wherein the outer skin further defines the first extension portion, the second extension portion, the third extension portion, the fourth extension portion, and an interior void space.

11. The structural element of claim 10, wherein the outer skin comprises a plurality of outer skin portions, each outer skin portion has an outer periphery and a plurality of connection edges formed along the outer periphery of the respective outer skin portion;

wherein the connection edges of one outer skin portion are configured to be fixedly coupled with the connection edges of at least one other outer skin portion.

12. The structural element of claim 10, further comprising:
a reinforcing structure, the reinforcement structure comprising a plurality of circumferential elements positioned in contact with the inwardly facing surface of the outer skin and about each of the extension portions.

13. The structural element of claim 10, wherein the outer skin is made of a polyurea-based material or a silicone material.

14. The structural element of claim 10, wherein a filler substance is disposed in the interior void space defined by the outer skin, and wherein the filler substance is at least one of a fluid, an aggregate, or a soil.

15. The structural element of claim 10, wherein a filler substance is disposed in the interior void space defined by the outer skin, and wherein the filler substance is an aggregate comprising a plurality of aggregate pieces; and
wherein an adhesive is disposed within the interior void space to bind the respective aggregate pieces within the outer skin.

16. A method of forming a structural element, the method comprising:
providing a negative form wherein the negative form comprises a form body, the form body having an external form surface and an interior center, the external form surface being divided into a first portion, a second portion, a third portion, and a fourth portion, the form body further defining:
a first extension portion disposed on a first axis and extending outwardly from the interior center in a first predetermined direction to a first distal end, the first extension portion defining a plurality of first extension portion flange members that extend outwardly therefrom;
a second extension portion disposed on a second axis extending outwardly from the interior center in a second predetermined direction to a second distal end, the second extension portion defining a plurality of second extension portion flange members that extend outwardly therefrom;
a third extension portion disposed on a third axis extending outwardly from the interior center in a third predetermined direction to a third distal end, the third extension portion defining a plurality of third extension portion flange members that extend outwardly therefrom;
a fourth extension portion disposed on a fourth axis extending outwardly from the interior center in a fourth predetermined direction to a fourth distal end, the fourth extension portion defining a plurality of fourth extension portion flange members that extend outwardly therefrom;
wherein each of the first axis, the second axis, the third axis, and the fourth axis defines and an angle with each of the other axes at the interior center, and wherein the angle between each of the respective axes is substantially equivalent;
applying an outer skin material to each of the first portion, the second portion, the third portion, and the fourth portion of the external form surface of the negative form until the outer skin material has a thickness of greater than 0.125 inches in each of each of the first portion, the second portion, the third portion, and the fourth portion, such that the outer skin material forms an outer skin of a structural element;
wherein the outer skin material is a polymeric material, and wherein the method further comprises:
initiating a curing or drying process for the polymeric material.

17. The method of claim 16, further comprising:
filling an interior void space defined by the outer skin with a filler substance, wherein the filler substance is at least one of a fluid, an aggregate, or a soil.

18. The method of claim 17, wherein the filler substance is the aggregate, the aggregate including a plurality of aggregate pieces, the method further comprising:
injecting an adhesive into the interior void space to bind the respective aggregate pieces to the other respective aggregate pieces within the outer skin;
initiating one of a curing or drying process for the adhesive; and
removing the outer skin.

19. The method of claim 16, wherein applying the polymeric material to each of the first portion, the second portion, the third portion, and the fourth portion of the external form surface of the negative form further comprises:
applying the polymeric material to the first portion of the external form surface of the negative form until the polymeric material has a thickness of greater than 0.125 inches to form an outer skin first portion;
applying the polymeric material to the second portion of the external form surface of the negative form until the polymeric material has a thickness of greater than 0.125 inches to form an outer skin second portion;
applying the polymeric material to each of the third portion of the external form surface of the negative form until the polymeric material has a thickness of greater than 0.125 inches to form an outer skin third portion;
applying the polymeric material to the fourth portion of the external form surface of the negative form until the polymeric material has a thickness of greater than 0.125 inches to form an outer skin fourth portion;
wherein each of the outer skin first portion, the outer skin second portion, the outer skin third portion, and the outer skin fourth portion define:
an inwardly facing surface in contact with external form surface;
an outwardly facing surface disposed opposite the inwardly facing surface, such that the thickness is defined from the inwardly facing surface to the outwardly facing surface; and
an outer periphery and a plurality of connection edges formed along the outer periphery of the respective outer skin portion.

20. The method of claim 19, further comprising:
upon completion of the curing process for the polyurea-based material, removing each of the first portion, the second portion, the third portion, and the fourth portion of the outer skin from the negative form;
selecting an installation location for the structural element;
positioning each of the first portion, the second portion, the third portion, and the fourth portion of the outer skin in the selected installation location;
fixedly coupling the connection edges formed along the outer periphery of each of the first portion, the second portion, the third portion, and the fourth portion of the outer skin to the connection edges formed along the outer periphery of at least one of the other respective portions of the outer skin of the structural element with a connection feature; and filling an interior void space defined by the outer skin with a filler substance, wherein the filler substance is at least one of a fluid, an aggregate, or a soil.

\* \* \* \* \*